United States Patent
Ogawa

(10) Patent No.: US 8,556,273 B2
(45) Date of Patent: Oct. 15, 2013

(54) VEHICLE SUSPENSION DEVICE

(75) Inventor: Atsushi Ogawa, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/698,503

(22) PCT Filed: May 19, 2010

(86) PCT No.: PCT/JP2010/058865
§ 371 (c)(1),
(2), (4) Date: Nov. 16, 2012

(87) PCT Pub. No.: WO2011/145226
PCT Pub. Date: Nov. 24, 2011

(65) Prior Publication Data
US 2013/0062851 A1    Mar. 14, 2013

(51) Int. Cl.
*B60G 17/015*    (2006.01)
(52) U.S. Cl.
USPC ......... 280/5.506; 280/5.5; 280/5.515; 701/37
(58) Field of Classification Search
USPC ............ 188/266.1, 266.7, 267, 267.1, 267.2;
280/5.5, 5.504, 5.505, 5.515, 124.106,
280/124.108, 5.506; 701/37, 38
See application file for complete search history.

(56) References Cited

U.S. PATENT DOCUMENTS

| | | | | |
|---|---|---|---|---|
| 2,184,202 | A * | 12/1939 | Tschanz | 280/5.506 |
| 5,056,811 | A * | 10/1991 | Fukunaga et al. | 280/5.503 |
| 5,204,815 | A * | 4/1993 | Yamamoto | 701/38 |
| 5,480,188 | A * | 1/1996 | Heyring | 280/124.104 |
| 7,005,816 | B2 | 2/2006 | Hio et al. | |
| 7,168,720 | B2 * | 1/2007 | Fontdecaba Buj | 280/124.159 |
| 7,621,538 | B2 * | 11/2009 | Nordmeyer et al. | 280/5.515 |
| 7,789,398 | B2 * | 9/2010 | Munday et al. | 280/5.507 |
| 2009/0273147 | A1 * | 11/2009 | Inoue et al. | 280/5.51 |
| 2013/0060422 | A1 * | 3/2013 | Ogawa et al. | 701/37 |

FOREIGN PATENT DOCUMENTS

| | | |
|---|---|---|
| JP | 2001-310736 A | 11/2001 |
| JP | 2002-541014 A | 12/2002 |
| JP | 2005-88854 A | 4/2005 |
| JP | 3722127 B2 | 9/2005 |
| JP | 2008-144920 A | 6/2008 |
| WO | 00/61393 A1 | 10/2000 |
| WO | 2007/049633 A1 | 5/2007 |

* cited by examiner

*Primary Examiner* — James English
(74) *Attorney, Agent, or Firm* — Sughrue Mion, PLLC

(57) ABSTRACT

Four electromagnetic shock absorbers (30) are provided with motors (40FL, 40FR, 40RL, 40RR). First current-carrying terminals (T1) of the motors (40FL, 40FR, 40RL, 40RR) are connected to one another by a ground line (61). Further, second current-carrying terminals (T2) of the motor (40FL) and the motor (40FR) are connected to each other by a front wheel roll damping line (62F). Second current-carrying terminals (T2) of the motor (40RL) and the motor (40RR) are connected to each other by a rear wheel roll damping line (62R). Second current-carrying terminals (T2) of the motor (40FL) and the motor (40RL) are connected to each other by a left wheel pitch damping line (63L). Second current-carrying terminals (T2) of the motor (40FR) and the motor (40RR) are connected to each other by a right wheel pitch damping line (63R). In this manner, appropriate damping forces can be generated with a simple configuration not only against vehicle bouncing but also against vehicle rolling and pitching.

1 Claim, 19 Drawing Sheets

VEHICLE SUSPENSION DEVICE

CROSS REFERENCE TO RELATED APPLICATIONS

This application is a National Stage of International Application No. PCT/JP2010/058865 filed May 19, 2010, the contents of all of which are incorporated herein by reference in their entirety.

TECHNICAL FIELD

The present invention relates to a vehicle suspension device, and more particularly, to a vehicle suspension device including an electromagnetic shock absorber for damping relative motion of a spring upper portion and a spring lower portion by causing a motor to generate a current by the relative motion of the spring upper portion and the spring lower portion.

BACKGROUND ART

As heretofore known in Japanese Patent No. 3722127, there is a vehicle suspension device in which an electromagnetic shock absorber driven by a motor is provided between a spring upper portion and a spring lower portion and the motor is controlled so as to obtain a damping force corresponding to a displacement input to the electromagnetic shock absorber. In the vehicle suspension device proposed in Japanese Patent No. 3722127, in addition to a motor drive circuit for driving the motor actively, an electric damping element for generating a damping force passively is connected in parallel to the motor. Active control is performed for an input to be controlled. For an input other than the control target, on the other hand, the electric damping element is used to generate a damping force passively.

DISCLOSURE OF THE INVENTION

However, in order to drive the motor actively, it is necessary to provide a sensor for detecting various kinds of vehicle behavior, a microcomputer for calculating the control amount of the motor based on a sensor detection value, a motor drive circuit for driving the motor with the calculated motor control amount, and other such components. Therefore, the scale of a motor control system becomes larger, resulting in increased cost.

In the suspension device in which the damping force is generated passively, on the other hand, a rotor of the motor is rotated by relative motion of the spring upper portion and the spring lower portion so that dynamic braking of the motor is performed to damp the relative motion of the spring upper portion and the spring lower portion. Therefore, a damping force appropriate for a change in vehicle posture cannot be generated. The reason is that each electromagnetic shock absorber independently generates a damping force corresponding to the relative speed of the spring upper portion and the spring lower portion.

The damping coefficient indicating damping properties of the shock absorber can be set as appropriate by adjusting the impedance of a circuit in which a generated current of the motor flows. For example, however, in the case where a small damping coefficient is set so as to obtain soft ride quality, the damping force is insufficient for the change in vehicle posture, such as behavior in the roll direction (rolling) and behavior in the pitch direction (pitching). On the other hand, in the case of setting a large damping coefficient so as to suppress the change in vehicle posture properly, the damping force is excessive for bouncing of the vehicle, and the ride quality deteriorates.

Therefore, in the suspension device in which the damping force is generated passively by each of the electromagnetic shock absorbers, the damping force appropriate for the overall vehicle behavior, such as bouncing, rolling, and pitching, cannot be generated.

The present invention has been made to deal with the above-mentioned problem, and it is an object thereof to provide a vehicle suspension device for generating a damping force appropriate for the overall vehicle behavior with a simple configuration.

In order to achieve the above-mentioned object, according to a feature of the present invention, there is provided a vehicle suspension device, including: electromagnetic shock absorbers provided to a plurality of wheels (WFL, WFR, WRL, WRR), the electromagnetic shock absorbers each including: a motor (40FL, 40FR, 40RL, 40RR) for generating a current along with relative motion of a spring upper portion (B) and a spring lower portion (W); and a closed loop circuit (51FL, 51FR, 51RL, 51RR) that electrically connects two current-carrying terminals (T1, T2) of the motor, for causing the generated current to flow through the motor, the electromagnetic shock absorbers (30FL, 30FR, 30RL, 30RR) each being configured to damp the relative motion of the spring upper portion and the spring lower portion when the generated current flows through the motor along with the relative motion of the spring upper portion and the spring lower portion; and an interconnection circuit (60) for electrically connecting the motors of at least two electromagnetic shock absorbers via first current-carrying terminals (T1) as one of the two current-carrying terminals and via second current-carrying terminals (T2) as another of the two current-carrying terminals.

The vehicle suspension device of the present invention includes the plurality of electromagnetic shock absorbers for damping the relative motion of the spring upper portion and the spring lower portion (approaching operation and separating operation of the spring upper portion and the spring lower portion). Each of the electromagnetic shock absorbers includes the motor and the closed loop circuit that electrically connects the two current-carrying terminals of the motor. Along with the relative motion of the spring upper portion and the spring lower portion, the motor generates an induced electromotive force proportional to the relative speed (stroke speed). Therefore, a generated current flows through the motor via the closed loop circuit. In this manner, the motor generates a damping force for damping the relative motion of the spring upper portion and the spring lower portion.

When each of the electromagnetic shock absorbers is operated independently, each electromagnetic shock absorber can generate an appropriate damping force against bouncing, which is vehicle behavior in the heave direction. This damping force, however, is not an appropriate damping force targeted at overall vehicle behavior, that is, a change in vehicle posture (rolling or pitching).

In view of the above, in the vehicle suspension device of the present invention, the motors of at least two electromagnetic shock absorbers are electrically connected to each other via the interconnection circuit. The interconnection circuit electrically connects the motors of the at least two electromagnetic shock absorbers to each other via the first current-carrying terminals as one of the two current-carrying terminals and via the second current-carrying terminals as the other of the two current-carrying terminals.

In the situation where the change in vehicle posture such as rolling or pitching occurs, the relative speed of the spring upper portion and the spring lower portion differs among the wheels, and hence the magnitudes of the induced electromotive forces generated in the motors are also different. Therefore, a potential difference is generated among the motors, and a current flows through the interconnection circuit due to the potential difference. Accordingly, a combined current of the current flowing through the closed loop circuit and the current flowing through the interconnection circuit flows through the motor.

Therefore, the electromagnetic shock absorber generates the damping force against the relative motion of the spring upper portion and the spring lower portion of the wheel and also generates the damping force corresponding to the difference in relative speed of the spring upper portion and the spring lower portion among the wheels.

As described above, according to the present invention, with the simple configuration in which the motors of the plurality of electromagnetic shock absorbers are electrically connected via the interconnection circuit, it is possible to generate the damping force against bouncing and also generate the damping force against the change in vehicle posture such as rolling or pitching for stabilizing the vehicle posture. In addition, the present invention can be carried out at low cost without needing to configure a large-scale damping force control system.

Note that, in the vehicle suspension device of the present invention, it is not always necessary to provide the electromagnetic shock absorbers to all the wheels. For example, the electromagnetic shock absorber may be provided only to the rear wheel or the front wheel, and the remaining wheels may be provided with shock absorbers different from the electromagnetic shock absorbers, such as a hydraulic damper shock absorber.

According to another feature of the present invention, the closed loop circuit (51FL, 51FR, 51RL, 51RR) includes an impedance element (RhFL, RhFR, RhRL, RhRR) for heave damping force setting interposed therein, for setting a damping force against the relative motion of the spring upper portion and the spring lower portion, and the interconnection circuit (60) includes an impedance element (RrF, RrR, RpL, Rpf) for posture change damping force setting interposed therein, for setting a damping force against a change in vehicle posture.

In the electromagnetic shock absorber, a generated current proportional to the relative speed (stroke speed) of the spring upper portion and the spring lower portion flows through the motor via the closed loop circuit. As the generated current flowing through the motor becomes larger, a larger damping force is generated by the electromagnetic shock absorber. In the present invention, the impedance element for heave damping force setting is interposed in the closed loop circuit, and hence, by adjusting the impedance of the impedance element for heave damping force setting, the damping force against the relative motion of the spring upper portion and the spring lower portion, that is, bouncing, can be set properly.

Further, when the vehicle posture changes, a potential difference is generated among the motors, and a current flows through the interconnection circuit due to the potential difference. The current flowing through the motor changes in accordance with the current flowing through the interconnection circuit. Therefore, the damping force against the change in vehicle posture can be varied by adjusting the magnitude of the current flowing through the interconnection circuit. In the present invention, the impedance element for posture change damping force setting is interposed in the interconnection circuit, and hence, by adjusting the impedance of the impedance element for posture change damping force setting, the damping force (damping coefficient) against the change in vehicle posture can be set properly. The impedance element for posture change damping force setting only needs to be interposed in, for example, a line that electrically connects the first current-carrying terminals of the motors or a line that electrically connects the second current-carrying terminals of the motors.

Therefore, according to the present invention, each of the damping force against bouncing and the damping force against the change in vehicle posture can be set properly.

Note that, the impedance element in the present invention means an element capable of adjusting the magnitude of the current flowing through the motor. Therefore, the impedance element is not limited to an electrical resistor, and a coil (inductor) or a capacitor can be used.

According to another feature of the present invention, the interconnection circuit (60) connects the motor (40FL, 40RL) of the electromagnetic shock absorber provided to a left wheel and the motor (40FR, 40RR) of the electromagnetic shock absorber provided to a right wheel to each other via the first current-carrying terminals (T1) and via the second current-carrying terminals (T2), and the impedance element for posture change damping force setting is an impedance element (RrF, RrR) for roll damping force setting for setting a damping force against vehicle rolling.

In the present invention, the motor of the electromagnetic shock absorber provided to the left wheel and the motor of the electromagnetic shock absorber provided to the right wheel are electrically connected to each other via the interconnection circuit including the impedance element for roll damping force setting.

In vehicle rolling, there is a large difference between an induced electromotive force generated in the motor of the electromagnetic shock absorber provided to the left wheel and an induced electromotive force generated in the motor of the electromagnetic shock absorber provided to the right wheel. For example, when the spring upper portion and the spring lower portion of one of the left and right wheels operate to approach each other, and when the spring upper portion and the spring lower portion of the other wheel operate to be spaced away from each other, the motor rotation directions are different between the electromagnetic shock absorber for the left wheel and the electromagnetic shock absorber for the right wheel, and hence the induced electromotive forces are generated in opposite directions. Accordingly, a large potential difference is generated between the left and right motors, and hence a current flows through the interconnection circuit.

The damping force against vehicle rolling depends on the magnitude of the current flowing through the interconnection circuit. In the present invention, the impedance element for roll damping force setting is interposed in the interconnection circuit, and hence, by adjusting the impedance of the impedance element for roll damping force setting, the damping force (damping coefficient) against vehicle rolling can be set properly.

Therefore, according to the present invention, each of the damping force against bouncing and the damping force against rolling can be set properly.

Note that, it is preferred that the interconnection circuit electrically connect the motor of the electromagnetic shock absorber provided to the left wheel and the motor of the electromagnetic shock absorber provided to the right wheel to each other both in the front wheel and in the rear wheel. Alternatively, however, the motor of the electromagnetic shock absorber provided to the left wheel and the motor of the electromagnetic shock absorber provided to the right wheel may be electrically connected to each other only in the front wheel. Alternatively, the motor of the electromagnetic shock absorber provided to the left wheel and the motor of the electromagnetic shock absorber provided to the right wheel may be electrically connected to each other only in the rear wheel.

According to another feature of the present invention, the interconnection circuit (60) connects the motor (40FL, 40FR) of the electromagnetic shock absorber provided to a front wheel and the motor (40RL, 40RR) of the electromagnetic shock absorber provided to a rear wheel to each other via the first current-carrying terminals (T1) and via the second current-carrying terminals (T2), and the impedance element for posture change damping force setting is an impedance element (RpL, RpR) for pitch damping force setting for setting a damping force against vehicle pitching.

In the present invention, the motor of the electromagnetic shock absorber provided to the front wheel and the motor of the electromagnetic shock absorber provided to the rear wheel are electrically connected to each other via the interconnection circuit including the impedance element for pitch damping force setting.

In vehicle pitching, there is a large difference between an induced electromotive force generated in the motor of the electromagnetic shock absorber provided to the front wheel and an induced electromotive force generated in the motor of the electromagnetic shock absorber provided to the rear wheel. For example, when the spring upper portion and the spring lower portion of one of the front and rear wheels operate to approach each other, and when the spring upper portion and the spring lower portion of the other wheel operate to be spaced away from each other, the motor rotation directions are different between the electromagnetic shock absorber for the front wheel and the electromagnetic shock absorber for the rear wheel, and hence the induced electromotive forces are generated in opposite directions. Accordingly, a large potential difference is generated between the front and rear motors, and hence a current flows through the interconnection circuit.

The damping force against vehicle pitching depends on the magnitude of the current flowing through the interconnection circuit. In the present invention, the impedance element for pitch damping force setting is interposed in the interconnection circuit, and hence, by adjusting the impedance of the impedance element for pitch damping force setting, the damping force (damping coefficient) against vehicle pitching can be set properly.

Therefore, according to the present invention, each of the damping force against bouncing and the damping force against pitching can be set properly.

According to another feature of the present invention, the interconnection circuit (60) electrically connects the first current-carrying terminals (T1) of the motors (40FL, 40FR, 40RL, 40RR) of the electromagnetic shock absorbers provided to a front left wheel, a front right wheel, a rear left wheel, and a rear right wheel, respectively, to each other, electrically connects the second current-carrying terminal of the motor (40FL) of the electromagnetic shock absorber provided to the front left wheel and the second current-carrying terminal of the motor (40FR) of the electromagnetic shock absorber provided to the front right wheel to each other via an impedance element (RrF) for front wheel roll damping force setting, electrically connects the second current-carrying terminal of the motor (40RL) of the electromagnetic shock absorber provided to the rear left wheel and the second current-carrying terminal of the motor (40RR) of the electromagnetic shock absorber provided to the rear right wheel to each other via an impedance element (RrR) for rear wheel roll damping force setting, electrically connects the second current-carrying terminal of the motor (40FL) of the electromagnetic shock absorber provided to the front left wheel and the second current-carrying terminal of the motor (40RL) of the electromagnetic shock absorber provided to the rear left wheel to each other via an impedance element (RpL) for left wheel pitch damping force setting, and electrically connects the second current-carrying terminal of the motor (40FR) of the electromagnetic shock absorber provided to the front right wheel and the second current-carrying terminal of the motor (40RR) of the electromagnetic shock absorber provided to the rear right wheel to each other via an impedance element (RpR) for right wheel pitch damping force setting.

In the present invention, the motors of the electromagnetic shock absorbers provided to the front left wheel, the front right wheel, the rear left wheel, and the rear right wheel are electrically connected to one another via the interconnection circuit. The interconnection circuit electrically connects the first current-carrying terminals of the motors of the electromagnetic shock absorbers to each other. Further, the interconnection circuit connects the second current-carrying terminal of the motor of the electromagnetic shock absorber provided to the front left wheel and the second current-carrying terminal of the motor of the electromagnetic shock absorber provided to the front right wheel to each other via the impedance element for front wheel roll damping force setting, and connects the second current-carrying terminal of the motor of the electromagnetic shock absorber provided to the rear left wheel and the second current-carrying terminal of the motor of the electromagnetic shock absorber provided to the rear right wheel to each other via the impedance element for rear wheel roll damping force setting. Therefore, in vehicle rolling, in the left and right motors on the front wheel side and the left and right motors on the rear wheel side, different currents depending on the rolling situation flow between the second current-carrying terminals via the impedance elements (RrF, RrR) for roll damping force setting. In this manner, by adjusting the impedance of each impedance element for roll damping force setting, the vehicle rolling can be suppressed properly on each of the vehicle front side and the vehicle rear side.

Further, the interconnection circuit connects the second current-carrying terminal of the motor of the electromagnetic shock absorber provided to the front left wheel and the second current-carrying terminal of the motor of the electromagnetic shock absorber provided to the rear left wheel to each other via the impedance element for left wheel pitch damping force setting, and connects the second current-carrying terminal of the motor of the electromagnetic shock absorber provided to the front right wheel and the second current-carrying terminal of the motor of the electromagnetic shock absorber provided to the rear right wheel to each other via the impedance element for right wheel pitch damping force setting. Therefore, in vehicle pitching, in the front and rear motors on the left wheel side and the front and rear motors on the right wheel side, different currents depending on the pitching situation flow between the second current-carrying terminals via the impedance elements (RpL, RpR) for pitch damping force setting. In this manner, by adjusting the impedance of each impedance element for pitch damping force setting, the vehicle pitching can be suppressed properly on each of the vehicle left side and the vehicle right side.

Note that, in the above description, the structure of the invention corresponding to the embodiment is accompanied by reference symbols used in the embodiment in parentheses to facilitate the understanding of the invention, but each constituent feature of the invention is not intended to be limited to the embodiment defined by the reference symbols.

BEST MODE FOR CARRYING OUT THE INVENTION

Figure 1:
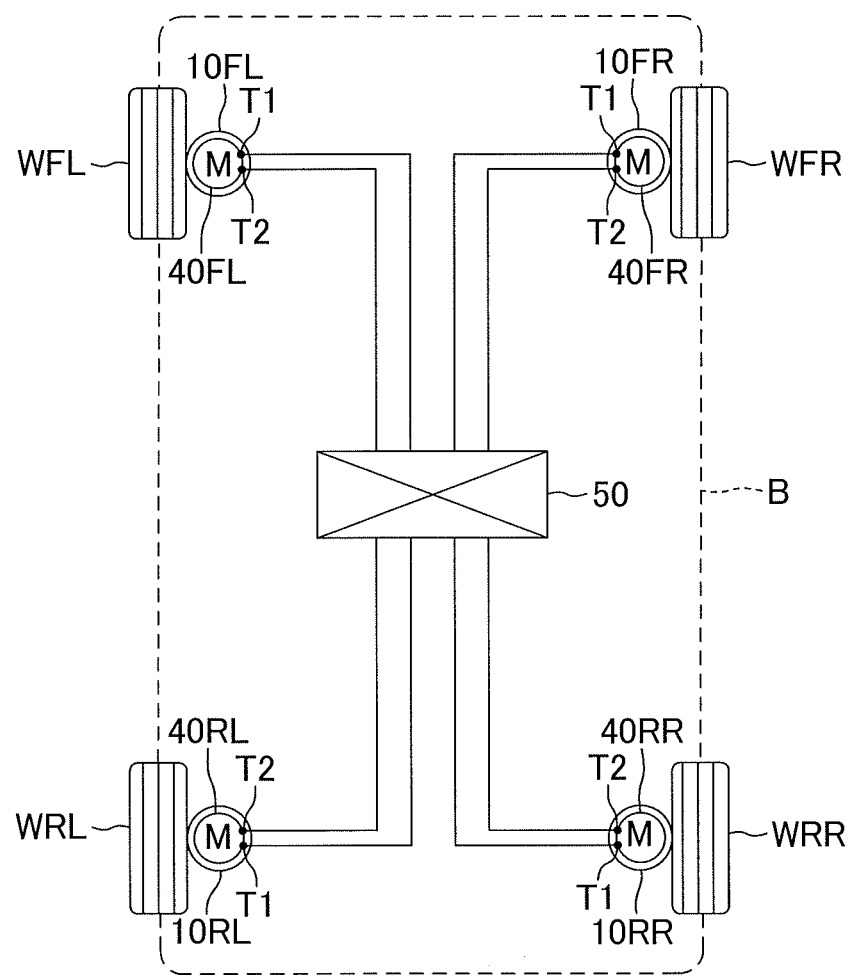
FIG. 1 is a system configuration diagram of a vehicle suspension device according to an embodiment of the present invention.

Referring to the drawings, a vehicle suspension device according to an embodiment of the present invention is described below. FIG. 1 schematically illustrates a system configuration of the vehicle suspension device according to the embodiment.

The suspension device includes a front left wheel suspension main body 10FL provided between a front left wheel WFL and a vehicle body B, a front right wheel suspension main body 10FR provided between a front right wheel WFR and the vehicle body B, a rear left wheel suspension main body 10RL provided between a rear left wheel WRL and the vehicle body B, and a rear right wheel suspension main body 10RR provided between a rear right wheel WRR and the vehicle body B. In the following, a set of the four suspension main bodies 10FL, 10FR, 10RL, and 10RR and a set of the four wheels WFL, WFR, WRL, and WRR are referred to simply as suspension main body 10 and wheel W unless otherwise necessary to distinguish the front, rear, left, and right.

Figure 2:
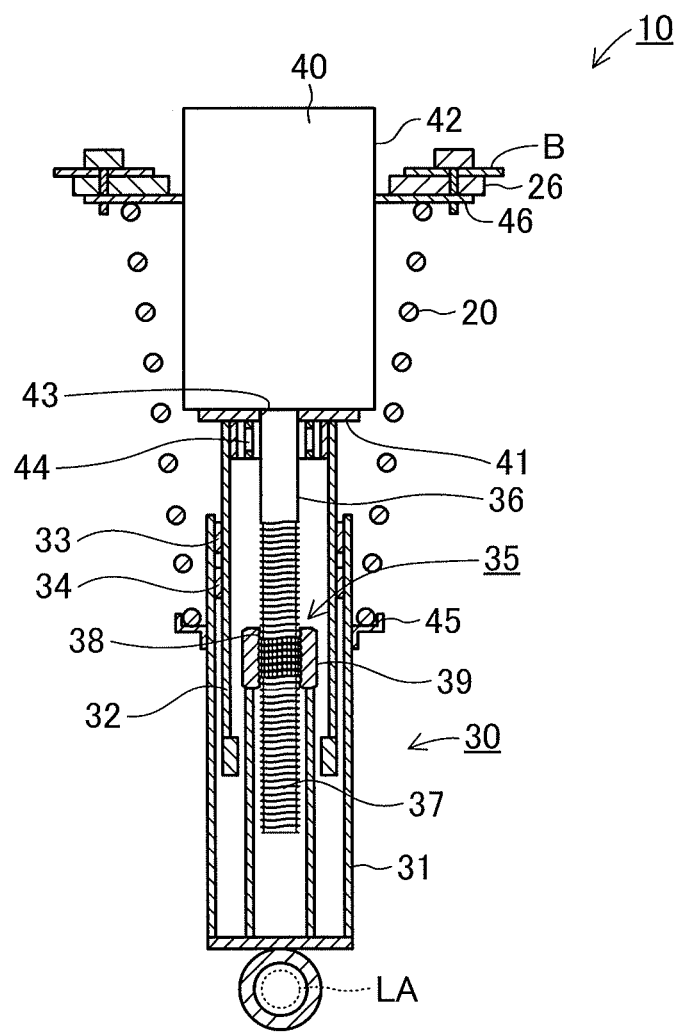
FIG. 2 is a cross-sectional view illustrating a schematic structure of a suspension main body.

As illustrated in FIG. 2, the suspension main body 10 includes a coil spring 20 and an electromagnetic shock absorber 30 in parallel. The coil spring 20 is provided between a lower arm LA supporting the wheel W and the vehicle body B, and serves as a suspension spring for absorbing impact from the road to improve ride quality and supporting the weight of the vehicle body B in an elastic manner. The electromagnetic shock absorber 30 generates a damping force against vertical vibration of the coil spring 20. In the following, the upper side of the coil spring 20, namely the vehicle body B side, is referred to as "spring upper portion", and the lower side of the coil spring 20, namely the wheel W side, is referred to as "spring lower portion".

The electromagnetic shock absorber 30 includes an outer cylinder 31 and an inner cylinder 32 arranged coaxially, a ball screw mechanism 35 serving as a reducer provided inside the inner cylinder 32, and an electric motor 40 (hereinafter referred to simply as motor 40) for generating an induced electromotive force when a rotor (not shown) is rotated by the operation of the ball screw mechanism 35. In this embodiment, a brushed DC motor is used as the motor 40.

The outer cylinder 31 and the inner cylinder 32 are formed of coaxial pipes with different diameters. The outer cylinder 31 is provided on the outer circumference of the inner cylinder 32 so as to be slidable in the axis direction. In FIG. 2, reference symbols 33 and 34 denote bearings for supporting the inner cylinder 32 so as to be slidable in the outer cylinder 31.

The ball screw mechanism 35 includes a ball screw 36 that rotates together with the rotor of the motor 40, and a ball screw nut 39 having a female screw portion 38 to be threadedly connected to a male screw portion 37 formed in the ball screw 36. The ball screw nut 39 is regulated by a detent (not shown) so that its rotational motion is inhibited. Therefore, in the ball screw mechanism 35, linear motion of the ball screw nut 39 in the vertical axis direction is converted to rotational motion of the ball screw 36, and, on the other hand, the rotational motion of the ball screw 36 is converted to the linear motion of the ball screw nut 39 in the vertical axis direction.

The lower end of the ball screw nut 39 is firmly fixed to the bottom surface of the outer cylinder 31. When an external force is applied so that the outer cylinder 31 is relatively moved in the axis direction with respect to the ball screw 36, the ball screw 36 rotates to rotate the motor 40. At this time, in the motor 40, an electromagnetic coil (not shown) provided in the rotor traverses the magnetic flux generated from a permanent magnet (not shown) provided in a stator, and an induced electromotive force is thereby generated in the electromagnetic coil. Thus, the motor 40 acts as a generator.

The upper end of the inner cylinder 32 is fixed to a mounting plate 41. The mounting plate 41 is fixed to a motor casing 42 of the motor 40, and the ball screw 36 is inserted in a through hole 43 formed at the center of the mounting plate 41. The ball screw 36 is coupled to the rotor of the motor 40 in the motor casing 42, and is rotatably supported by a bearing 44 provided in the inner cylinder 32.

The coil spring 20 is interposed in a compressed state between a circular retainer 45 provided on the outer circumferential surface of the outer cylinder 31 and the mounting plate 46 of the motor 40. The suspension main body 10 configured as described above is mounted to the vehicle body B through the intermediation of an upper support 26 made of an elastic material at the top surface of the mounting plate 46.

In the case where the spring lower portion (wheel W) moves vertically during the running of the vehicle, the outer cylinder 31 slides in the axis direction with respect to the inner cylinder 32 so that the coil spring 20 expands and contracts, to thereby absorb the impact from the road to improve the ride quality and also support the weight of the vehicle. In this case, the ball screw nut 39 moves vertically with respect to the ball screw 36 to rotate the ball screw 36. Therefore, in the motor 40, the rotor rotates to generate the induced electromotive force in the electromagnetic coil so that a generated current flows via an external circuit 50 to be described later, and hence a resistive force to stop the rotation of the rotor is generated. The resistive force acts as a damping force in the electromagnetic shock absorber 30. The damping force can be adjusted by adjusting the magnitude of the current flowing through the electromagnetic coil of the motor 40 by the external circuit 50.

In the following, the electromagnetic shock absorber 30 is referred to simply as absorber 30. For distinguishing the absorber 30 and the motor 40 depending on the wheel position, the absorber 30 and the motor 40 provided to the front left wheel suspension main body 10FL are referred to as front left wheel absorber 30FL and front left wheel motor 40FL, the absorber 30 and the motor 40 provided to the front right wheel suspension main body 10FR are referred to as front right wheel absorber 30FR and front right wheel motor 40FR, the absorber 30 and the motor 40 provided to the rear left wheel suspension main body 10RL are referred to as rear left wheel absorber 30RL and rear left wheel motor 40RL, and the absorber 30 and the motor 40 provided to the rear right wheel suspension main body 10RR are referred to as rear right wheel absorber 30RR and rear right wheel motor 40RR.

The four electromagnetic shock absorbers 30FL, 30FR, 30RL, and 30RR are provided with the common external circuit 50 for causing the generated current to flow through the motors 40FL, 40FR, 40RL, and 40RR. The external circuit 50 allows the generated current to flow between current-carrying terminals T1 and T2 of the motor 40 by the induced electromotive force generated in the motor 40 when the rotor of the motor 40 is rotated via the ball screw mechanism 35 by the relative motion between the spring upper portion (vehicle body B side) and the spring lower portion (wheel W side). Therefore, the absorber 30 generates a damping force against the relative motion between the spring upper portion and the spring lower portion by a braking force acting on the rotor when the generated current flows through the motor 40.

Figure 3:
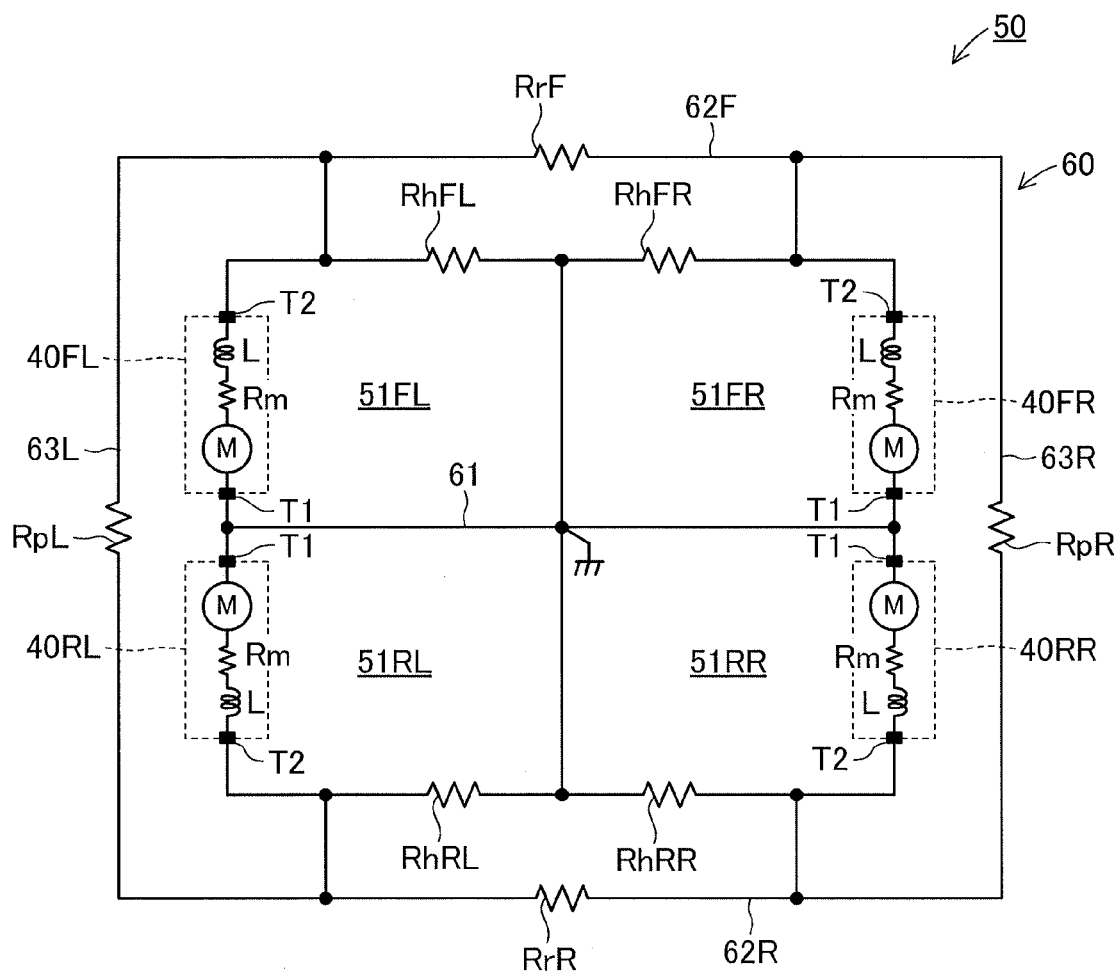
FIG. 3 is a circuit configuration diagram of an external circuit.

As illustrated in FIG. 3, the external circuit 50 includes, for the respective motors 40FL, 40FR, 40RL, and 40RR, closed loop circuits 51FL, 51FR, 51RL, and 51RR for each connecting the first current-carrying terminal T1 and the second current-carrying terminal T2, and further includes an interconnection circuit 60 for electrically interconnecting the four motors 40FL, 40FR, 40RL, and 40RR. In FIG. 3, Rm represents the internal resistance of the motor 40 and L represents the inductance of the motor 40. In the circuit diagram illustrated in FIG. 3, the motors 40FL, 40FR, 40RL, and 40RR are added to the external circuit 50.

Figure 4:
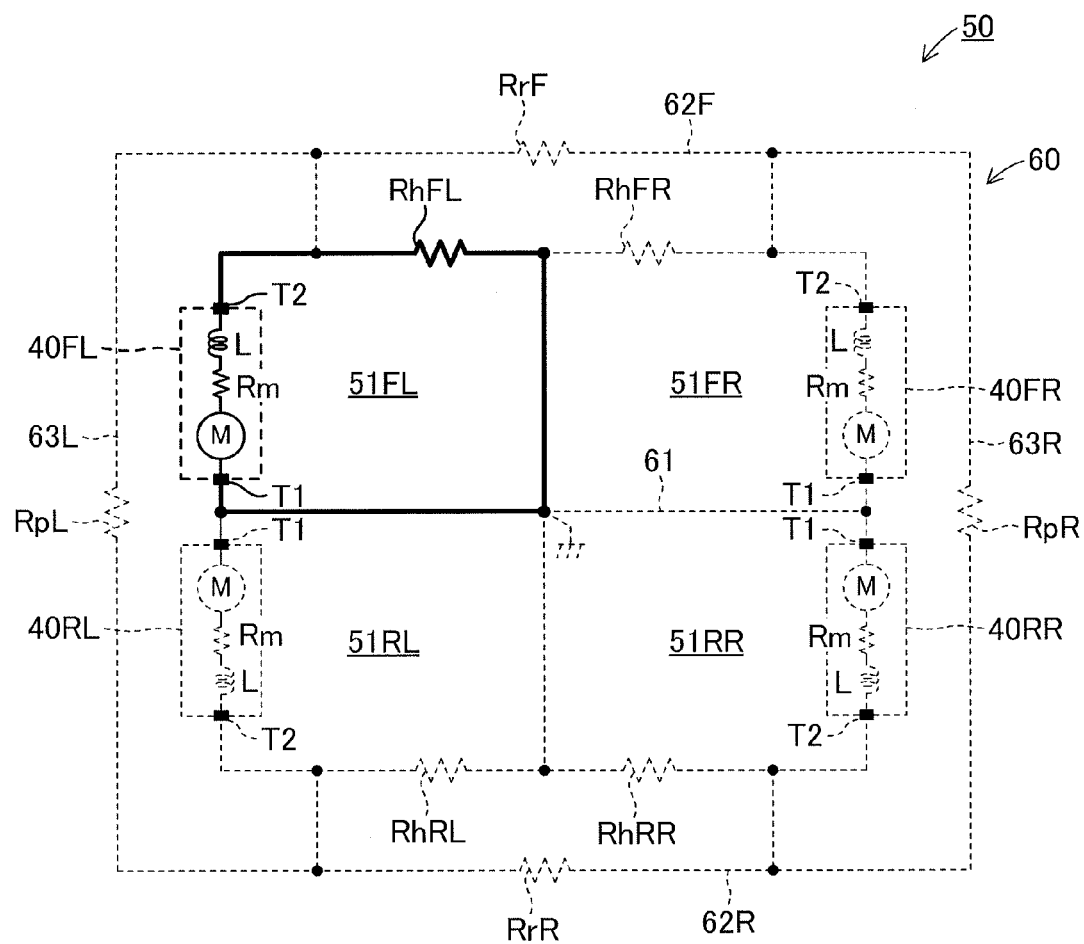
FIG. 4 is a circuit diagram illustrating a closed loop circuit of a front left wheel absorber.
Figure 5:
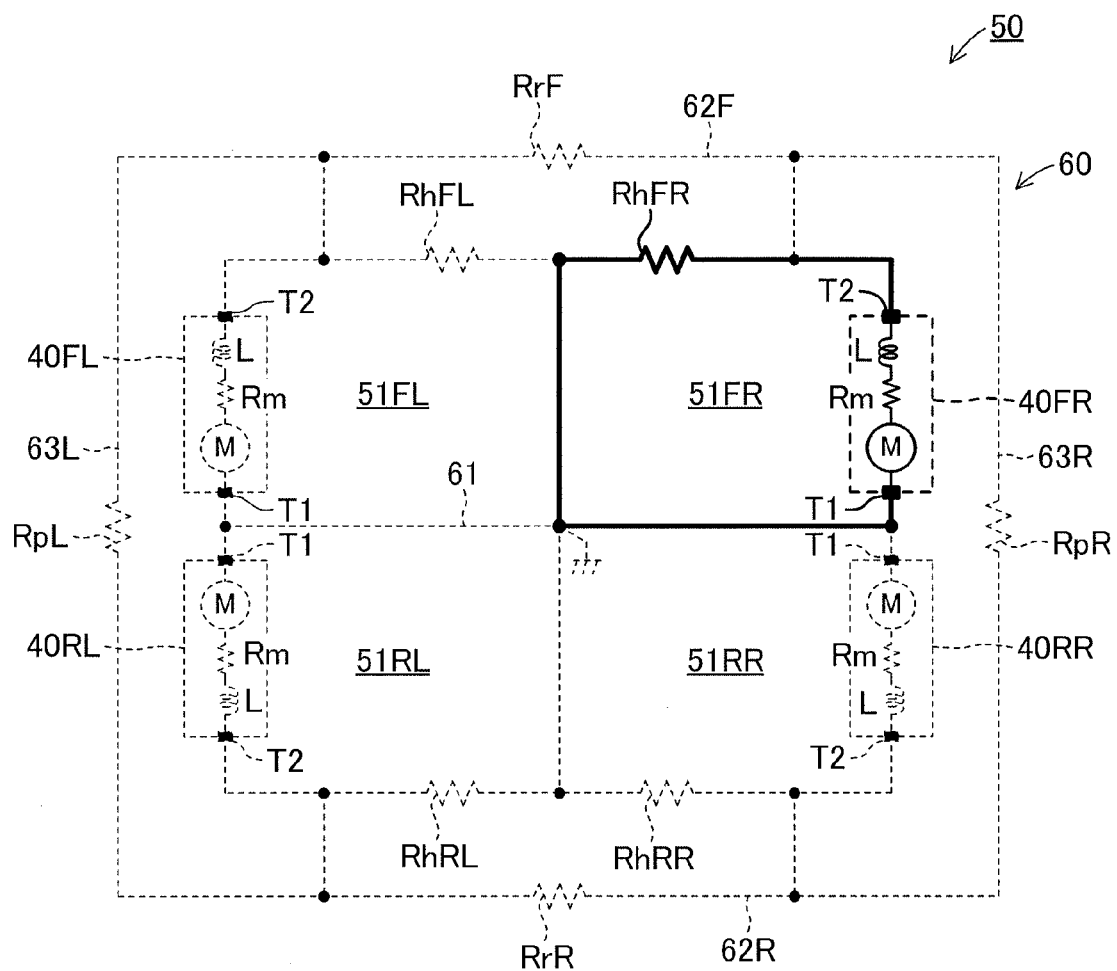
FIG. 5 is a circuit diagram illustrating a closed loop circuit of a front right wheel absorber.
Figure 6:
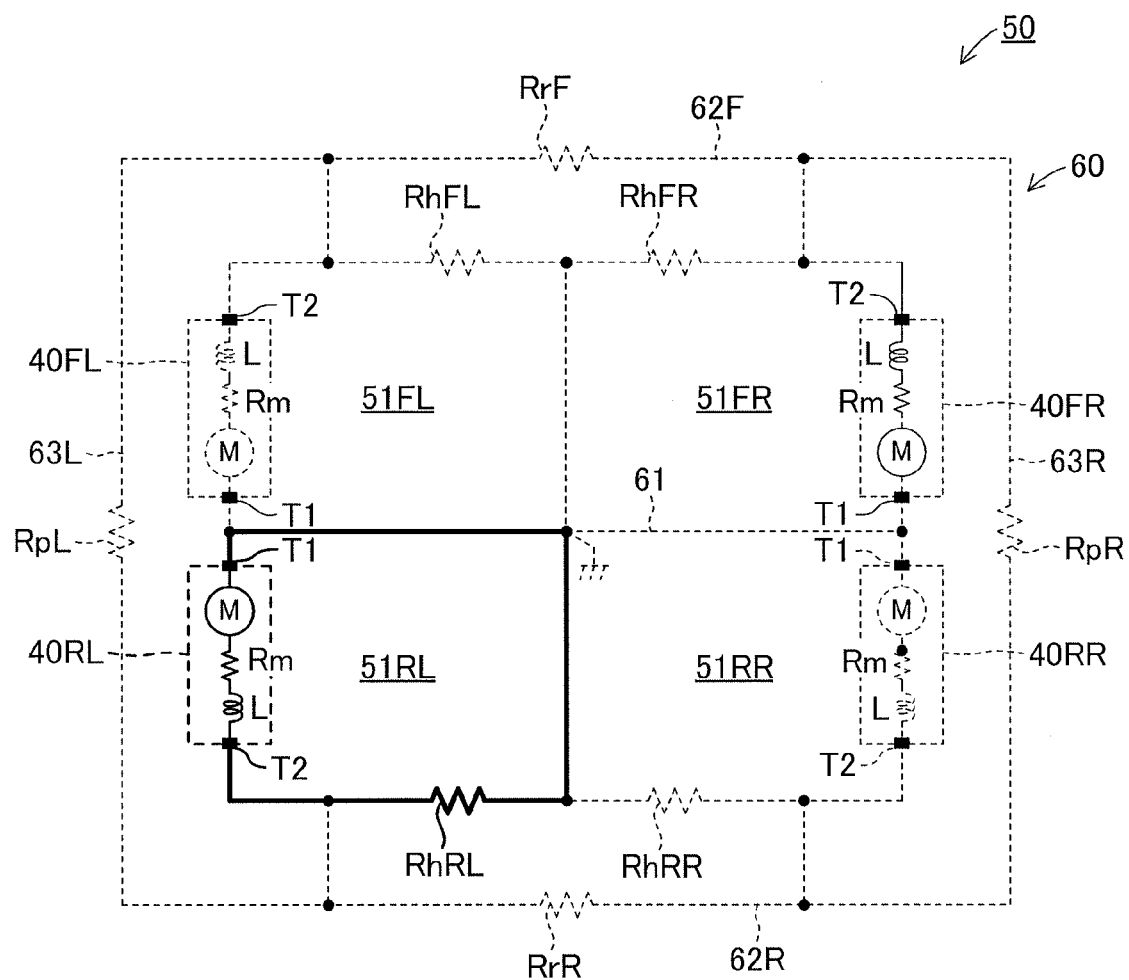
FIG. 6 is a circuit diagram illustrating a closed loop circuit of a rear left wheel absorber.
Figure 7:
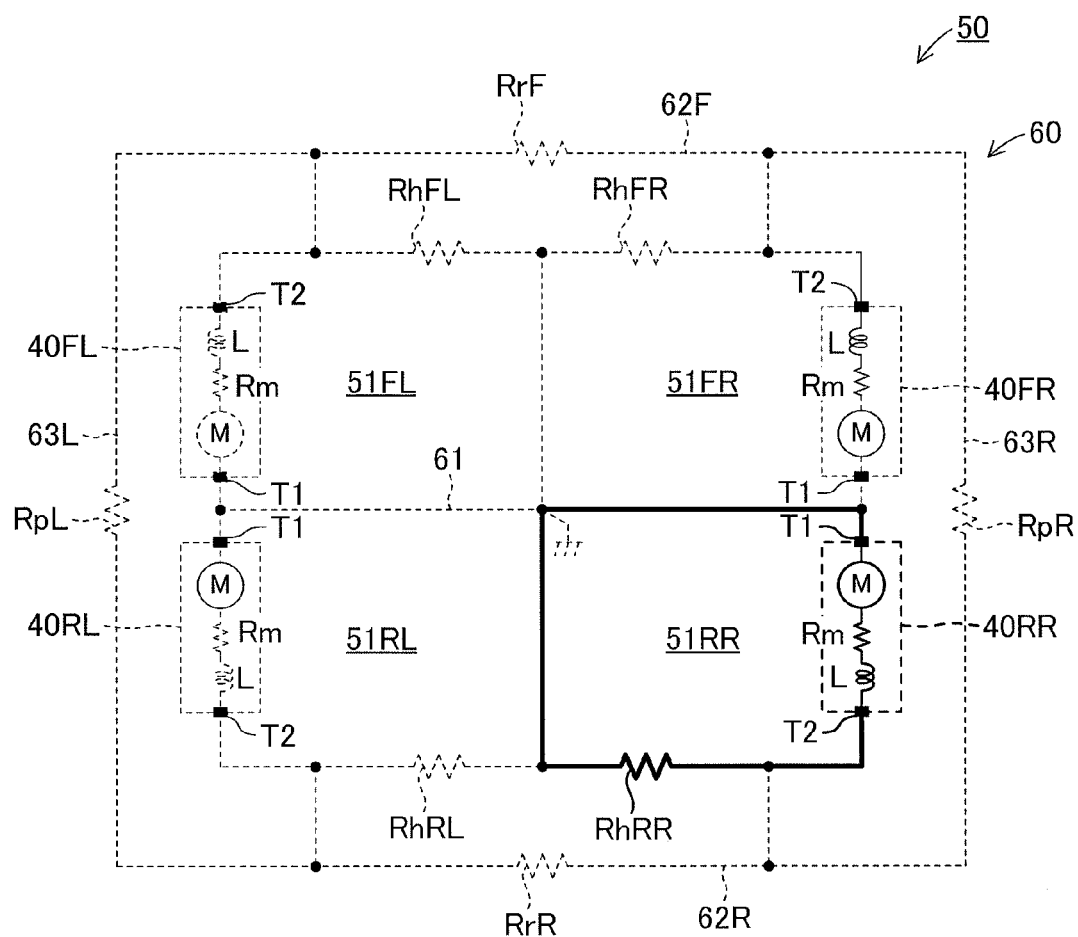
FIG. 7 is a circuit diagram illustrating a closed loop circuit of a rear right wheel absorber.

As illustrated in FIG. 4, the closed loop circuit 51FL is formed by connecting the first current-carrying terminal T1 and the second current-carrying terminal T2 of the front left wheel motor 40FL via a resistor RhFL for heave damping force setting. As illustrated in FIG. 5, the closed loop circuit 51FR is formed by connecting the first current-carrying terminal T1 and the second current-carrying terminal T2 of the front right wheel motor 40FR via a resistor RhFR for heave damping force setting. As illustrated in FIG. 6, the closed loop circuit 51RL is formed by connecting the first current-carrying terminal T1 and the second current-carrying terminal T2 of the rear left wheel motor 40RL via a resistor RhRL for heave damping force setting. As illustrated in FIG. 7, the closed loop circuit 51RR is formed by connecting the first current-carrying terminal T1 and the second current-carrying terminal T2 of the rear right wheel motor 40RR via a resistor RhRR for heave damping force setting. The electrical resistance values of the resistors RhFL, RhFR, RhRL, and RhRR are all set to the same value (Rh ohms).

Figure 8:
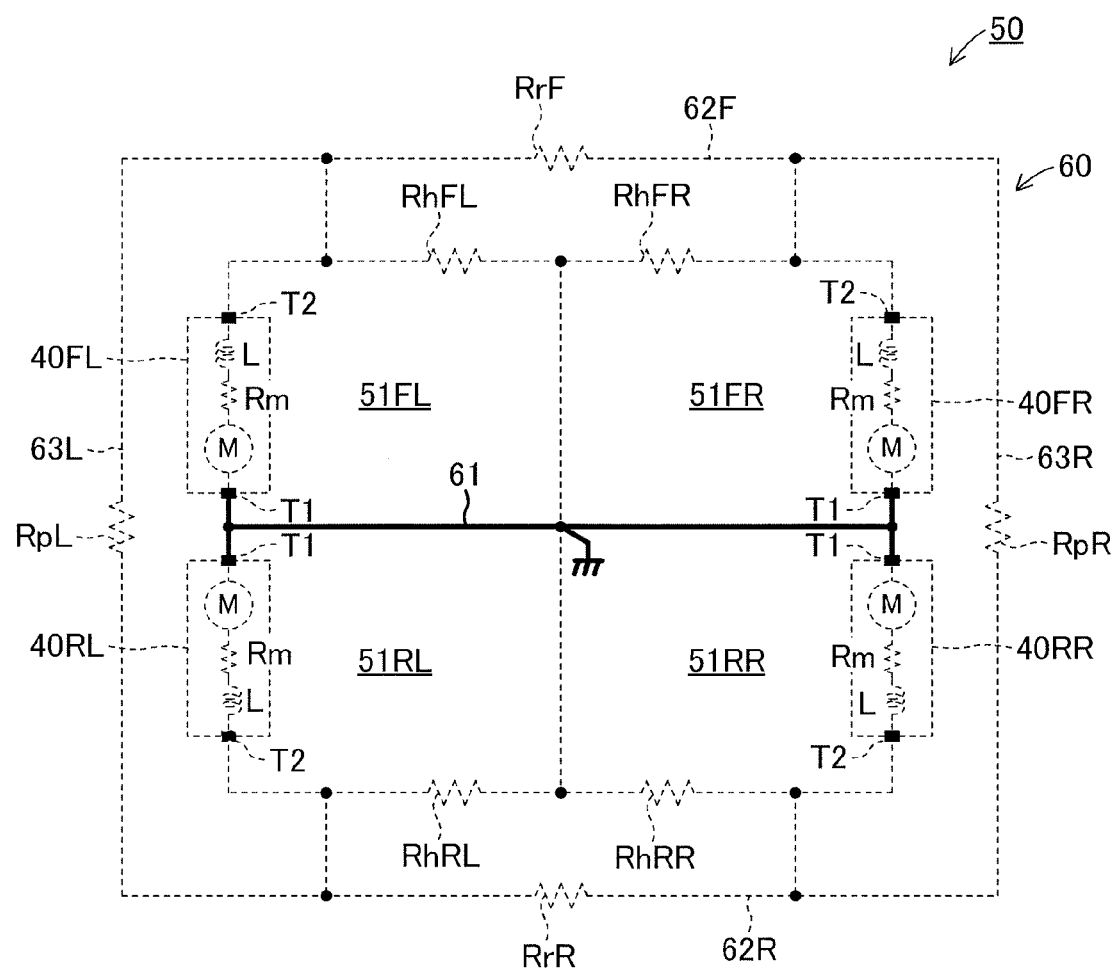
FIG. 8 is a circuit diagram illustrating a ground line in an interconnection circuit.
Figure 9:
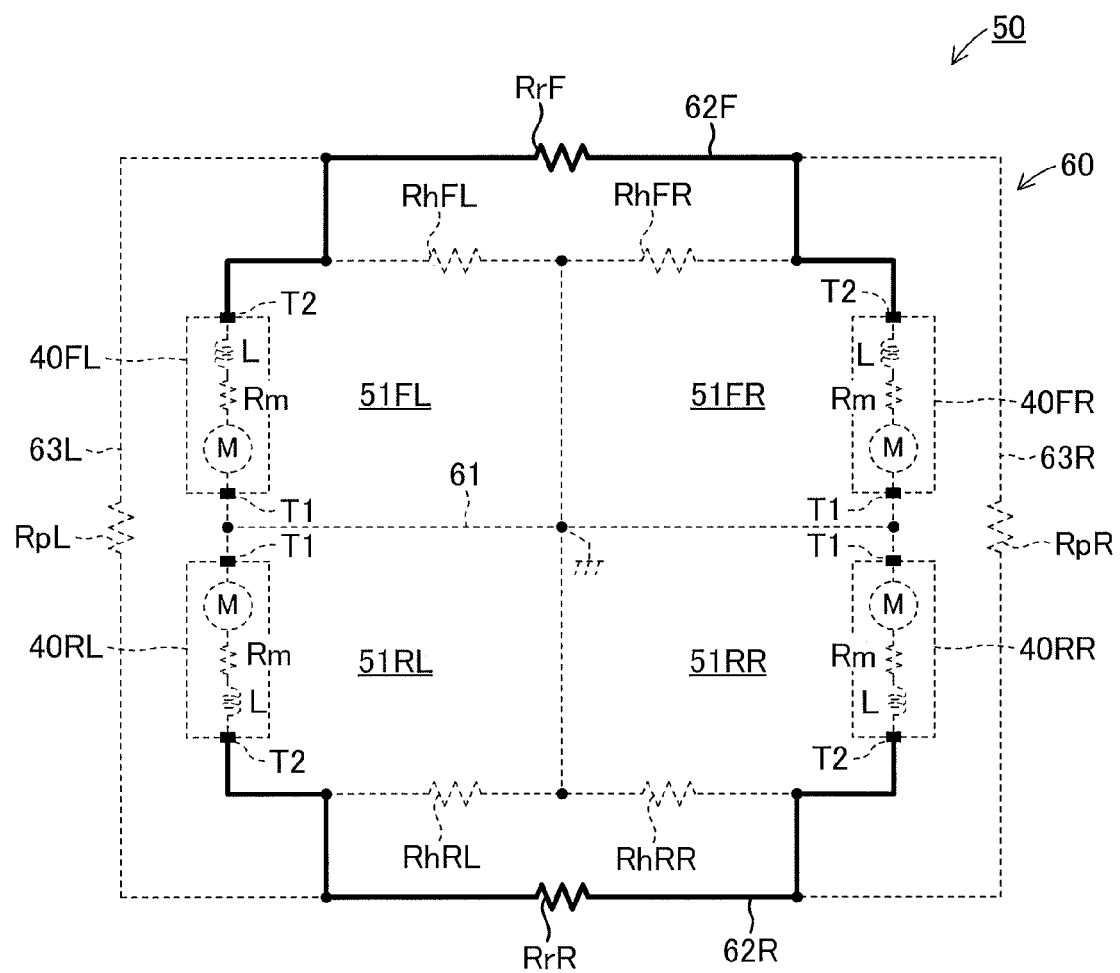
FIG. 9 is a circuit diagram illustrating a front wheel roll damping line and a rear wheel roll damping line in the interconnection circuit.
Figure 10:
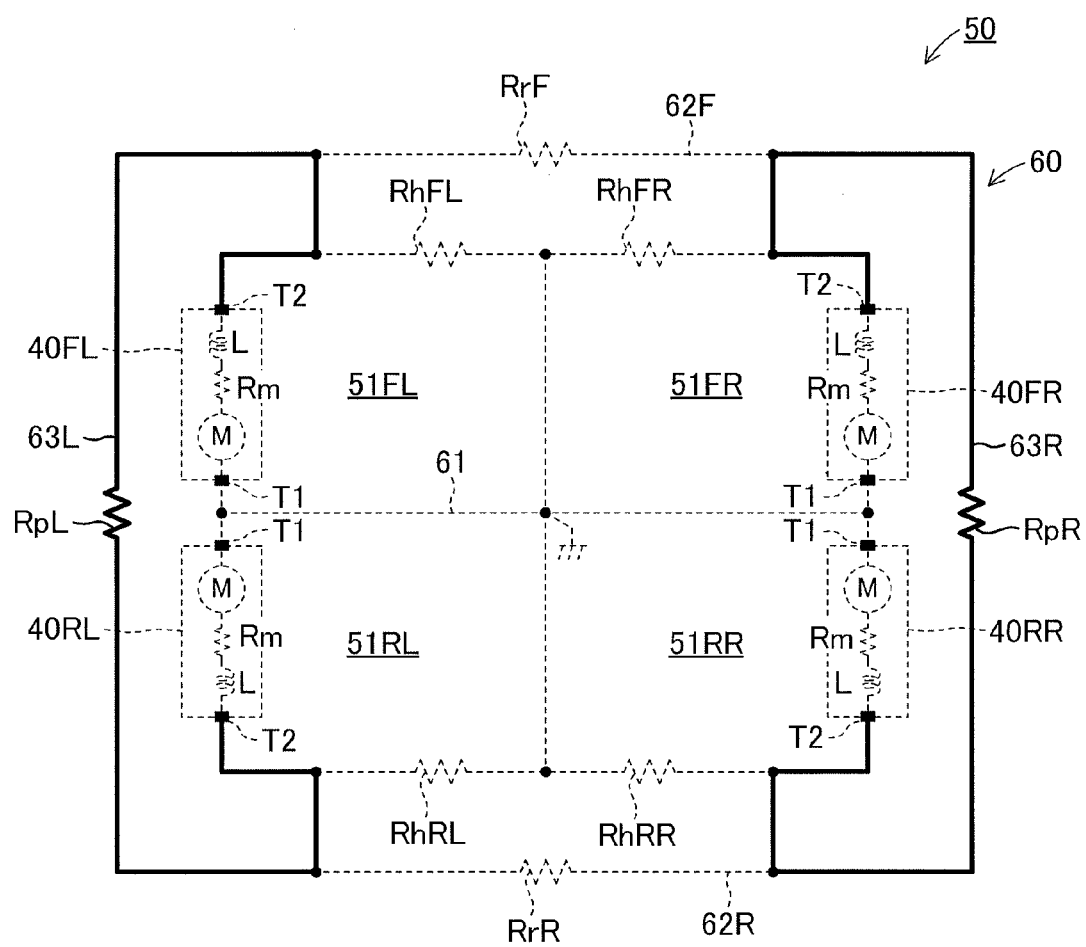
FIG. 10 is a circuit diagram illustrating a left wheel pitch damping line and a right wheel pitch damping line in the interconnection circuit.

As illustrated in FIG. 8, the interconnection circuit 60 includes a ground line 61 that interconnects the first current-carrying terminals T1 of the motors 40FL, 40FR, 40RL, and 40RR. Therefore, all the first current-carrying terminals T1 of the motors 40FL, 40FR, 40RL, and 40RR have the same potential. As illustrated in FIG. 9, the interconnection circuit 60 further includes a front wheel roll damping line 62F that connects the second current-carrying terminal T2 of the front left wheel motor 40FL and the second current-carrying terminal T2 of the front right wheel motor 40FR to each other via a resistor RrF for front wheel roll damping force setting, and a rear wheel roll damping line 62R that connects the second current-carrying terminal T2 of the rear left wheel motor 40RL and the second current-carrying terminal T2 of the rear right wheel motor 40RR to each other via a resistor RrR for rear wheel roll damping force setting. As illustrated in FIG. 10, the interconnection circuit 60 further includes a left wheel pitch damping line 63L that connects the second current-carrying terminal T2 of the front left wheel motor 40FL and the second current-carrying terminal T2 of the rear left wheel motor 40RL via a resistor RpL for left wheel pitch damping force setting, and a right wheel pitch damping line 63R that connects the second current-carrying terminal T2 of the front right wheel motor 40FR and the second current-carrying terminal T2 of the rear right wheel motor 40RR via a resistor RpR for right wheel pitch damping force setting.

Therefore, the interconnection circuit 60 is formed of the ground line 61, the front wheel roll damping line 62F, the rear wheel roll damping line 62R, the left wheel pitch damping line 63L, and the right wheel pitch damping line 63R.

The electrical resistance value of the resistor RrF and the electrical resistance value of the resistor RrR are set to the same value (Rr ohms). The electrical resistance value of the resistor RpL and the electrical resistance value of the resistor RpR are set to the same value (Rp ohms).

Next, the operation of the external circuit 50 is described. When the rotor is rotated via the ball screw mechanism 35 by the relative motion of the spring upper portion and the spring lower portion, the motor 40 generates an induced electromotive force in a direction corresponding to the rotation direction. For example, in the compression operation where the spring upper portion and the spring lower portion come close to each other to compress the absorber 30, the second current-carrying terminal T2 of the motor 40 has a high potential and the first current-carrying terminal T1 has a low potential. On the other hand, in the extension operation where the spring upper portion and the spring lower portion are spaced away from each other to extend the absorber 30, the first current-carrying terminal T1 of the motor 40 has a high potential and the second current-carrying terminal T2 has a low potential.

In this embodiment, in the four motors 40FL, 40FR, 40RL, and 40RR, one current-carrying terminal which has a high potential when the absorber 30 is in the compression operation is set as the second current-carrying terminal T2. However, the current-carrying terminal which has a high potential when the absorber 30 is in the compression operation may be set as the first current-carrying terminal T1. It is sufficient that the current-carrying terminals which have a high potential (low potential) in response to the extension/compression operation of the absorber 30 are uniformly set as the first current-carrying terminal T1 or the second current-carrying terminal T2.

Figure 11:
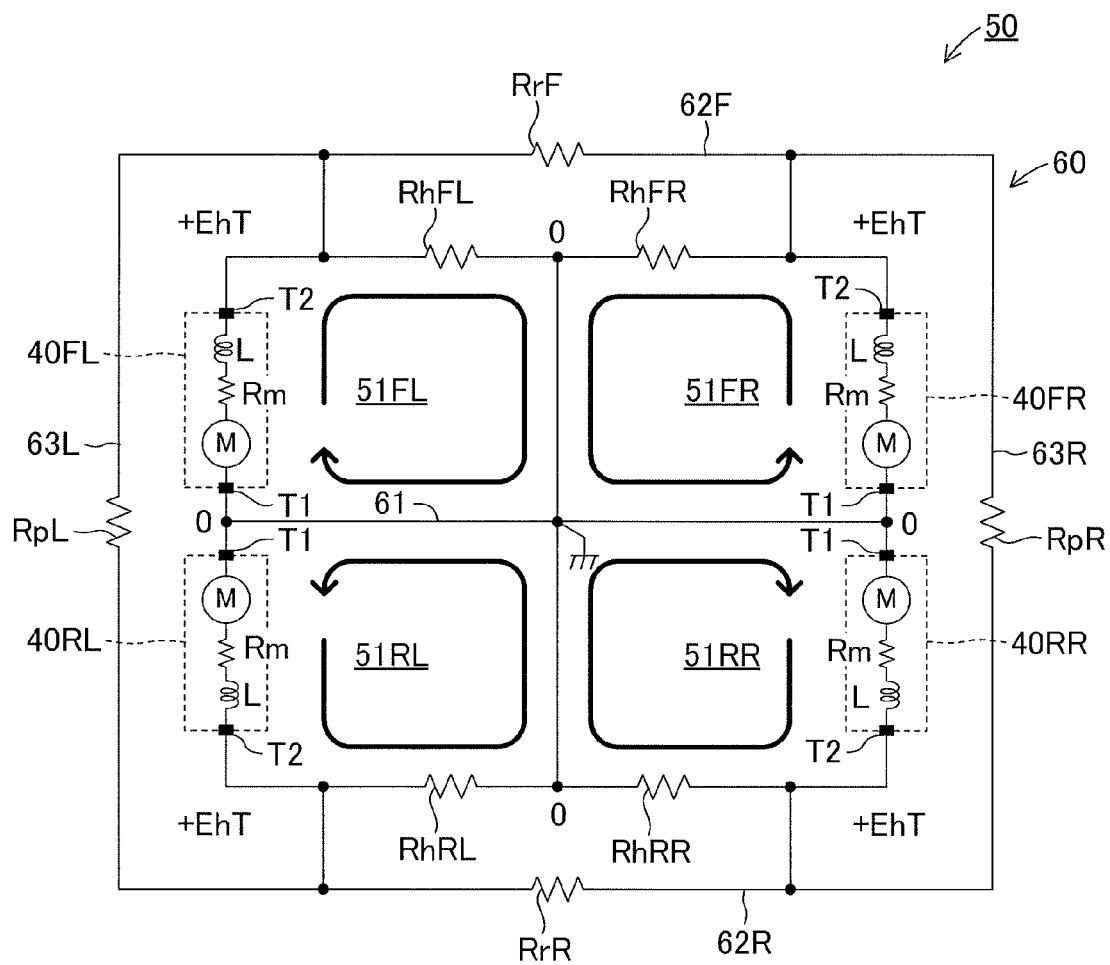
FIG. 11 is an explanatory diagram illustrating the flow of a generated current during bouncing (compression operation).
Figure 12:
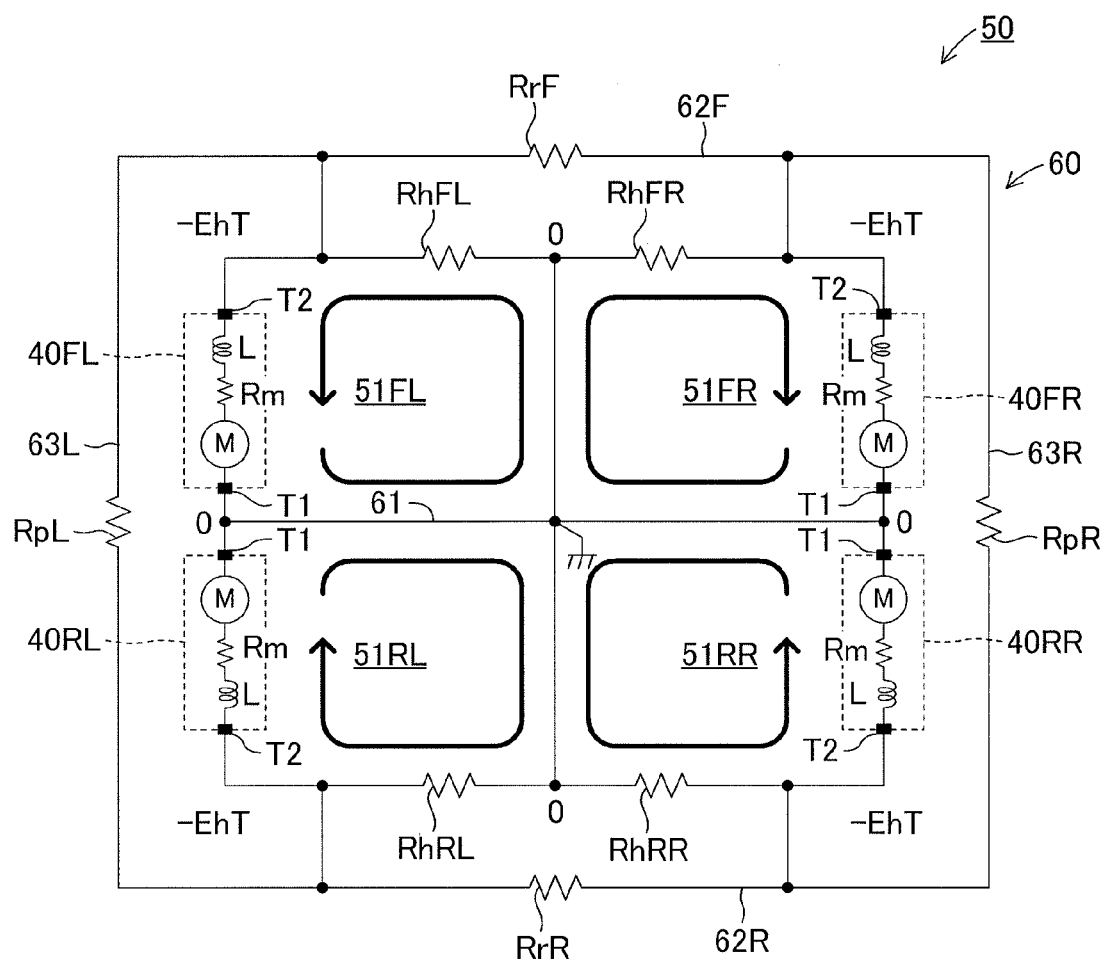
FIG. 12 is an explanatory diagram illustrating the flow of a generated current during bouncing (extension operation).

First, the flow of a generated current in vehicle bouncing (the relative motion of the spring upper portion and the spring lower portion in the vertical direction) is described with reference to FIG. 11. Consider the case where the spring upper portion and the spring lower portion all have relative motion at the same stroke speed in the four wheels WFL, WFR, WRL, and WRR. For example, when the four absorbers 30FL, 30FR, 30RL, and 30RR have the compression operation at the same speed, an induced electromotive force of the same voltage (Eh volts) is generated in the four motors 40FL, 40FR, 40RL, and 40RR. Therefore, the potential of the second current-carrying terminal T2 becomes higher than the ground potential of the first current-carrying terminal T1. In this case, all the second current-carrying terminals T2 of the four motors 40FL, 40FR, 40RL, and 40RR have the same potential (+EhT volts), and hence, as illustrated in FIG. 11, no current flows in the roll damping lines 62F and 62R and in the pitch damping line 63L and 63R, but a generated current flows only in the closed loop circuits 51FL, 51FR, 51RL, and 51RR. The generated currents all have the same current value in the four closed loop circuits 51FL, 51FR, 51RL, and 51RR. Note that, when the four absorbers 30FL, 30FR, 30RL, and 30RR have the extension/compression operation at the same speed, all the second current-carrying terminals T2 have the same negative potential (−EhT), and hence, as illustrated in FIG. 12, a generated current flows in the closed loop circuits 51FL, 51FR, 51RL, and 51RR in the reverse direction.

The generated current flows through the motor 40, and a braking force acts on the rotor. In this manner, the absorber 30 generates a damping force against the vehicle bouncing.

When the current value of the generated currents flowing through the motors 40FL, 40FR, 40RL, and 40RR is represented by im and the voltage value of the induced electromotive forces generated in the motors 40FL, 40FR, 40RL, and 40RR is represented by Eh, the generated current im is expressed by Expression (1) below.

$$im = Eh/(Rm+Ls+Rh) \tag{1}$$

where Rh represents the electric resistance value of the resistors RhFL, RhFR, RhRL, and RhRR, and s represents the Laplace operator.

The induced electromotive force Eh is expressed by Expression (2) below.

$$Eh = (2\Pi/N) \cdot X' \cdot Km \tag{2}$$

where N represents the lead of the ball screw 36, X' represents the stroke speed of the absorber 30, and Km represents the torque constant of the motor 40.

Torque T generated by the motor 40 when the generated current im flows is expressed by Expression (3) below.

$$T = Km \cdot im \tag{3}$$

A damping force F generated by the motor 40 is expressed by Expression (4) below.

$$F = (2\Pi/N) \cdot T \tag{4}$$

Therefore, when Expressions (1) to (3) are substituted into Expression (4), the damping force F is expressed by Expression (5) below.

$$F = (2\Pi/N)^2 \cdot X' \cdot Km^2/(Rm+Ls+Rh) \tag{5}$$

The damping coefficient Ch of the absorber 30 against the vehicle bouncing can be obtained by dividing the damping force F by the stroke speed X', and hence the damping coefficient Ch is expressed by Expression (6) below.

$$Ch = (2\Pi/N)^2 \cdot Km^2/(Rm+Ls+Rh) \tag{6}$$

Therefore, by adjusting the value of the denominator in Expression (6), the damping coefficient Ch can be set so that appropriate ride quality may be obtained. In this case, an optimum value of the damping coefficient Ch in the steady state (s=0) is set without taking the frequency characteristics of vibration into account. The internal resistance Rm of the motor 40 is a fixed value, and hence, by adjusting the resistance value Rh of the resistors RhFL, RhFR, RhRL, and RhRR for heave damping force setting, the damping coefficient Ch can be set to a value for obtaining appropriate ride quality. In this case, the damping force against the vehicle bouncing can be increased as the resistance value Rh is set to be smaller, and the damping force against the vehicle bouncing can be reduced as the resistance value Rh is set to be larger.

Next, the flow of a generated current in vehicle rolling is described with reference to FIG. 13. In the vehicle rolling, the left wheel absorbers 30FL and 30RL and the right wheel absorbers 30FR and 30RR have opposite operation directions. Consider the case where the left wheel absorbers 30FL and 30RL perform the compression operation while the right wheel absorbers 30FR and 30RR perform the extension operation, that is, the case where the vehicle turns to the right direction. The magnitudes (absolute values) of the stroke speeds of the absorbers 30FL, 30RL, 30FR, and 30RR are all the same.

The four motors 40FL, 40FR, 40RL, and 40RR generate induced electromotive forces of the same voltage (Er volts), but the direction of the induced electromotive forces generated by the front left wheel motor 40FL and the rear left wheel motor 40RL and the direction of the induced electromotive forces generated by the front right wheel motor 40FR and the rear right wheel motor 40RR are opposite to each other. Therefore, the second current-carrying terminal T2 of the front left wheel motor 40FL and the second current-carrying terminal T2 of the rear left wheel motor 40RL have the same potential with respect to the ground line 61, and, when the potential is +ErT volts, the second current-carrying terminal T2 of the front right wheel motor 40FR and the second current-carrying terminal T2 of the rear right wheel motor 40RR have the potential of −ErT volts.

In this case, a potential difference of 2ErT volts is generated between the second current-carrying terminal T2 of the front left wheel motor 40FL and the second current-carrying terminal T2 of the front right wheel motor 40FR. Further, a potential difference of 2ErT volts is generated between the second current-carrying terminal T2 of the rear left wheel motor 40RL and the second current-carrying terminal T2 of the rear right wheel motor 40RR. Therefore, in the external circuit, as illustrated in FIG. 13, a generated current flows from the second current-carrying terminal T2 of the front left wheel motor 40FL to the second current-carrying terminal T2 of the front right wheel motor 40FR, and a generated current flows from the second current-carrying terminal T2 of the rear left wheel motor 40RL to the second current-carrying terminal T2 of the rear right wheel motor 40RR.

In this case, the generated current from the second current-carrying terminal T2 of the front left wheel motor 40FL to the second current-carrying terminal T2 of the front right wheel motor 40FR flows through a parallel resistor circuit in which a resistor formed of the two resistors RhFL and RhFR for heave damping force setting connected in series and the resistor RrF for roll damping force setting are connected in parallel. The generated current from the second current-carrying terminal T2 of the rear left wheel motor 40RL to the second current-carrying terminal T2 of the rear right wheel motor 40RR flows through a parallel resistor circuit in which a resistor formed of the two resistors RhRL and RhRR for heave damping force setting connected in series and the resistor RrR for roll damping force setting are connected in parallel.

Those generated currents flow through the four motors 40FL, 40FR, 40RL, and 40RR, and the four absorbers 30FL, 30FR, 30RL, and 30RR generate the damping force against the vehicle rolling in association with one another.

When the current value of the generated currents flowing through the motors 40FL, 40FR, 40RL, and 40RR is represented by im and the voltage value of the induced electromotive forces generated in the motors 40FL, 40FR, 40RL, and 40RR is represented by Er, the generated current im is expressed by Expression (7) below. Here, the current value flowing through the motors 40FL and 40FR is shown, but the same holds true for the current value flowing through the motors 40RL and 40RR.

$$im = 2Er/(2Rm + 2Ls + Rrh) \quad (7)$$

where Rrh represents a combined resistance value of the parallel resistor circuit in which the resistor RrF (resistance value Rr) for roll damping force setting is connected in parallel to the series circuit (resistance value: 2Rh) formed of the two resistors RhRL and RhRR for heave damping force setting. Therefore, Rrh is expressed by $2Rh \cdot Rr/(2Rh + Rr)$.

The induced electromotive force Er is expressed by Expression (8) below.

$$Er = (2\Pi/N) \cdot X' \cdot Km \quad (8)$$

Torque T generated by the motor 40 when the generated current im flows is expressed by Expression (9) below.

$$T = Km \cdot im \quad (9)$$

A damping force F generated by the motor 40 is expressed by Expression (10) below.

$$F = (2\Pi/N)T \quad (10)$$

Therefore, when Expressions (7) to (9) are substituted into Expression (10), the damping force F is expressed by Expression (11) below.

$$F = 2(2\Pi/N)^2 \cdot X' \cdot Km^2/(Rm + 2Ls + Rrh) \quad (11)$$

The damping coefficient Cr of the absorber 30 against the vehicle rolling can be obtained by dividing the damping force F by the stroke speed X', and hence the damping coefficient Cr is expressed by Expression (12) below.

$$Cr = 2(2\Pi/N)^2 \cdot Km^2/(2Rm + 2Ls + Rrh) \quad (12)$$

Therefore, by adjusting the value of the denominator in Expression (12), the damping coefficient Cr can be set so that the vehicle rolling may be suppressed properly. In this case, an optimum value of the damping coefficient Cr in the steady state (s=0) is set without taking the frequency characteristics of vibration into account. The internal resistance Rm of the motor 40 is a fixed value, and hence, by adjusting the combined resistance value Rrh ($=2Rh \cdot Rr/(2Rh + Rr)$), the damping coefficient Cr can be set to a value for suppressing the vehicle rolling properly. In this case, Rh is the resistance value set to a value for obtaining appropriate ride quality as described above, and hence Rr only needs to be set to a proper value without changing the resistance value Rh.

Figure 13:
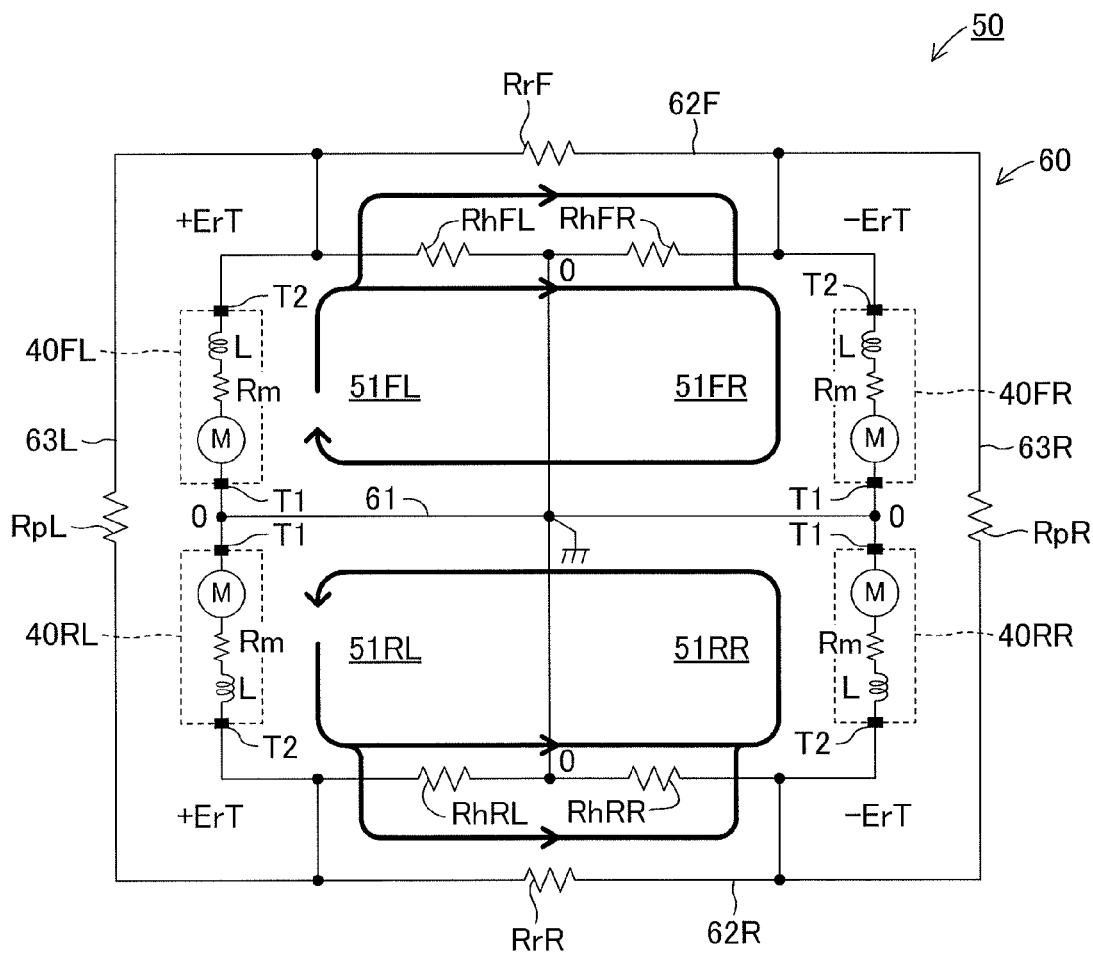
FIG. 13 is an explanatory diagram illustrating the flow of a generated current during rolling.

In the vehicle rolling, as illustrated in FIG. 13, the generated current flowing through the motor 40 is increased by the amount of the current flowing through the resistor RrF (RrR) for roll damping force setting, as compared to the bouncing. Therefore, the damping force can be increased by the amount corresponding to the increase in the current (2ErT/Rr). In the example of FIG. 13, the damping force against the compression operation is increased in the front left wheel absorber 30FL and the rear left wheel absorber 30RL, and the damping force against the extension operation is increased in the front right wheel absorber 30FR and the rear right wheel absorber 30RR. Therefore, by adjusting the resistance value Rr of the resistors RrF and RrR for roll damping force setting to adjust the increased amount of the generated current flowing in the vehicle rolling, the damping force (damping coefficient Cr) against the vehicle rolling can be set properly.

The damping force against the vehicle rolling can be increased as the resistance value Rr of the resistors RrF and RrR for roll damping force setting is set to be smaller. Therefore, for example, when the damping force against the vehicle rolling is to be increased, the resistance value Rr of the resistors RrF and RrR for roll damping force setting is set to be smaller. On the other hand, when the damping force against the vehicle rolling is to be reduced, the resistance value Rr of the resistors RrF and RrR for roll damping force setting is set to be larger.

In this manner, a small damping force can be generated against vehicle bouncing to maintain comfortable ride quality, and a large damping force can be generated against vehicle rolling to maintain good stable handling.

Next, the flow of a generated current in vehicle pitching is described with reference to FIG. 14. In the vehicle pitching, the front wheel absorbers 30FL and 30FR and the rear wheel absorbers 30RL and 30RR have opposite operation directions. Consider the case where the front wheel absorbers 30FL and 30FR perform the compression operation while the rear wheel absorbers 30RL and 30RR perform the extension operation. The magnitudes (absolute values) of the stroke speeds of the absorbers 30FL, 30RL, 30FR, and 30RR are all the same.

The four motors 40FL, 40FR, 40RL, and 40RR generate induced electromotive forces of the same voltage (Ep volts), but the direction of the induced electromotive forces generated by the front left wheel motor 40FL and the front right wheel motor 40FR and the direction of the induced electromotive forces generated by the rear left wheel motor 40RL and the rear right wheel motor 40RR are opposite to each other. Therefore, the second current-carrying terminal T2 of the front left wheel motor 40FL and the second current-carrying terminal T2 of the front right wheel motor 40FR have the same potential with respect to the ground line 61, and, when the potential is +EpT volts, the second current-carrying terminal T2 of the rear left motor 40RL and the second current-carrying terminal T2 of the rear right wheel motor 40RR have the potential of −EpT volts.

In this case, a potential difference of 2EpT volts is generated between the second current-carrying terminal T2 of the front left wheel motor 40FL and the second current-carrying terminal T2 of the rear left wheel motor 40RL. Further, a potential difference of 2EpT volts is generated between the second current-carrying terminal T2 of the front right wheel motor 40FR and the second current-carrying terminal T2 of the rear right wheel motor 40RR. Therefore, in the external circuit, as illustrated in FIG. 14, a generated current flows from the second current-carrying terminal T2 of the front left wheel motor 40FL to the second current-carrying terminal T2 of the rear left wheel motor 40RL, and a generated current flows from the second current-carrying terminal T2 of the front right wheel motor 40FR to the second current-carrying terminal T2 of the rear right wheel motor 40RR.

In this case, the generated current from the second current-carrying terminal T2 of the front left wheel motor 40FL to the second current-carrying terminal T2 of the rear left wheel motor 40RL flows through a parallel resistor circuit in which a resistor formed of the two resistors RhFL and RhRL for heave damping force setting connected in series and the resistor RpL for pitch damping force setting are connected in parallel. The generated current from the second current-carrying terminal T2 of the front right wheel motor 40FR to the second current-carrying terminal T2 of the rear right wheel motor 40RR flows through a parallel resistor circuit in which a resistor formed of the two resistors RhFR and RhRR for heave damping force setting connected in series and the resistor RpR for pitch damping force setting are connected in parallel.

Those generated currents flow through the four motors 40FL, 40FR, 40RL, and 40RR, and the four absorbers 30FL, 30FR, 30RL, and 30RR generate the damping force against the vehicle pitching in association with one another.

When the current value of the generated currents flowing through the motors 40FL, 40FR, 40RL, and 40RR is represented by im and the voltage value of the induced electromotive forces generated in the motors 40FL, 40FR, 40RL, and 40RR is represented by Ep, the generated current im is expressed by Expression (13) below. Here, the current value flowing through the motors 40FL and 40RL is shown, but the same holds true for the current value flowing through the motors 40FR and 40RR.

$$im = 2Ep/(2Rm + 2Ls + Rph) \quad (13)$$

where Rph represents a combined resistance value of the parallel resistor circuit in which the resistor RpL (resistance value Rp) for pitch damping force setting is connected in parallel to the series circuit (resistance value: 2Rh) formed of the two resistors RhFL and RhRL for heave damping force setting. Therefore, Rph is expressed by $2Rh \cdot Rp/(2Rh+Rp)$.

The induced electromotive force Ep is expressed by Expression (14) below.

$$Ep = (2\Pi/N) \cdot X' \cdot Km \quad (14)$$

Torque T generated by the motor 40 when the generated current im flows is expressed by Expression (15) below.

$$T = Km \cdot im \quad (15)$$

A damping force F generated by the motor 40 is expressed by Expression (16) below.

$$F = (2\Pi/N) \cdot T \quad (16)$$

Therefore, when Expressions (13) to (15) are substituted into Expression (16), the damping force F is expressed by Expression (17) below.

$$F = 2(2\Pi/N)^2 \cdot X' \cdot Km^2/(2Rm + 2Ls + Rph) \quad (17)$$

The damping coefficient Cp of the absorber 30 against the vehicle pitching can be obtained by dividing the damping force F by the stroke speed X', and hence the damping coefficient Cp is expressed by Expression (18) below.

$$Cp = 2(2\Pi/N)^2 \cdot Km^2/(2Rm + 2Ls + Rph) \quad (18)$$

Therefore, by adjusting the value of the denominator in Expression (18), the damping coefficient Cp can be set so that the vehicle pitching may be suppressed properly. In this case, an optimum value of the damping coefficient Cp in the steady state (s=0) is set without taking the frequency characteristics of vibration into account. The internal resistance Rm of the motor 40 is a fixed value, and hence, by adjusting the combined resistance value Rph(=2Rh·Rp/(2Rh+Rp)), the damping coefficient Cp can be set to a value for suppressing the vehicle pitching properly. In this case, Rh is the resistance value set to a value for obtaining appropriate ride quality as described above, and hence Rp only needs to be set to a proper value without changing the resistance value Rh.

Figure 14:
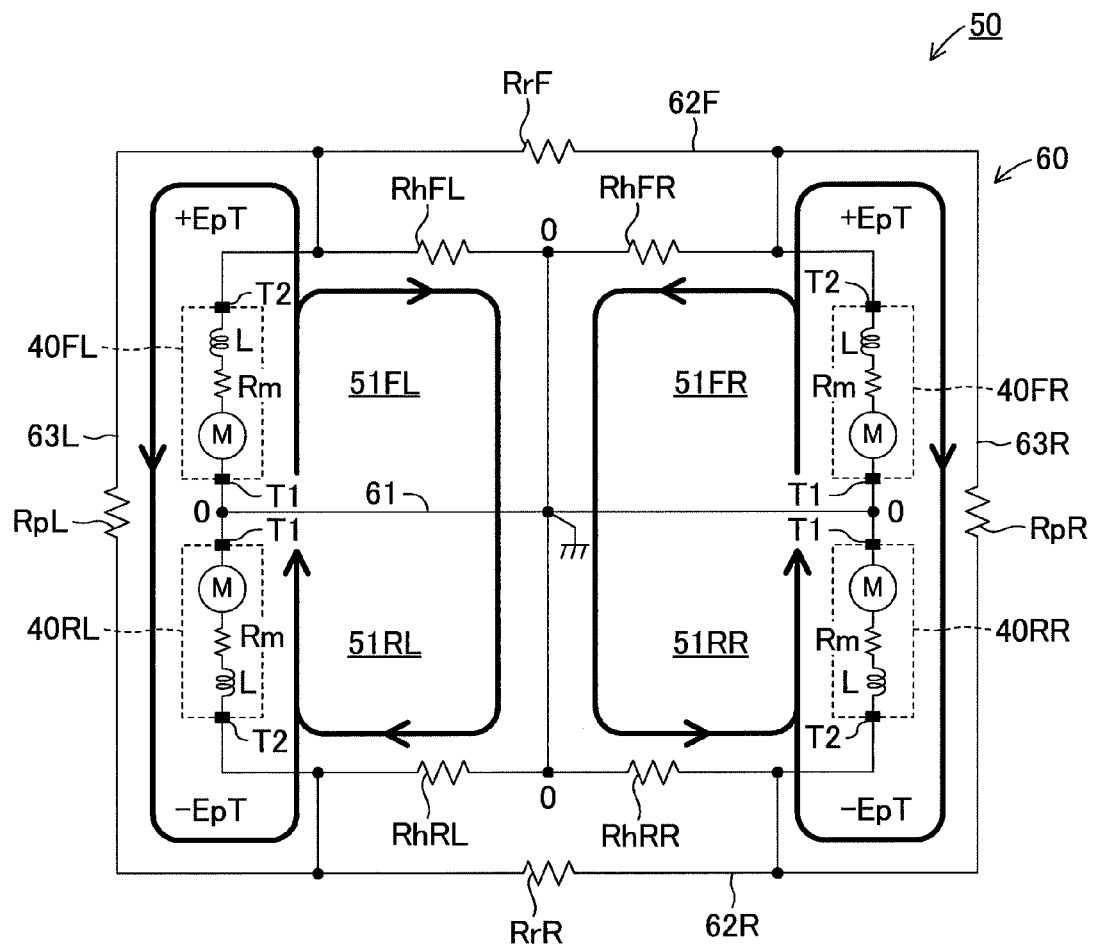
FIG. 14 is an explanatory diagram illustrating the flow of a generated current during pitching.

In the vehicle pitching, as illustrated in FIG. 14, the generated current flowing through the motor 40 is increased by the amount of the current flowing through the resistor RpL (RpR) for pitch damping force setting, as compared to the bouncing. Therefore, the damping force can be increased by the amount corresponding to the increase in the current (2EpT/Rp). In the example of FIG. 14, the damping force against the compression operation is increased in the front left wheel absorber 30FL and the front right wheel absorber 30FR, and the damping force against the extension operation is increased in the rear left wheel absorber 30RL and the rear right wheel absorber 30RR. Therefore, by adjusting the resistance value Rp of the resistors RpL and RpR for pitch damping force setting to adjust the increased amount of the generated current flowing in the vehicle pitching, the damping force (damping coefficient Cp) against the vehicle pitching can be set properly.

The damping force against the vehicle pitching can be increased as the resistance value Rp of the resistors RpL and RpR for pitch damping force setting is set to be smaller. Therefore, for example, when the damping force against the vehicle pitching is to be increased, the resistance value Rp of the resistors RpL and RpR for pitch damping force setting is set to be smaller. On the other hand, the damping force against the vehicle pitching is to be reduced, the resistance value Rp of the resistors RpL and RpR for pitch damping force setting is set to be larger.

In this manner, a small damping force can be generated against vehicle bouncing to maintain comfortable ride quality, and a large damping force can be generated against vehicle pitching to maintain good stable handling.

The description on the operation of the external circuit 50 is directed to independent vehicle bouncing, rolling, or pitching, but the same holds true for the case of a combination of those vehicle behaviors. For example, consider the case where the four absorbers 30FL, 30FR, 30RL, and 30RR perform the compression operation and the stroke speed of the absorbers 30FL and 30RL on the left wheel WFL and WRL side is larger than the stroke speed of the absorbers 30FR and 30RR on the right wheel WFR and WRR side. In other words, consider the combination of vehicle bouncing and rolling. In this case, the induced electromotive forces generated in the motors 40FL and 40RL is larger than the induced electromotive forces generated in the motors 40FR and 40RR. Therefore, when the potentials of the second current-carrying terminals T2 of the left front wheel motor 40FL and the left rear wheel motor 40RL with respect to the ground line 61 is represented by +ErTL volts, and the potentials of the second current-carrying terminals T2 of the right front wheel motor 40FR and the right rear wheel motor 40RR is represented by +ErTR volts, ErTL>ErTR is established.

Figure 15:
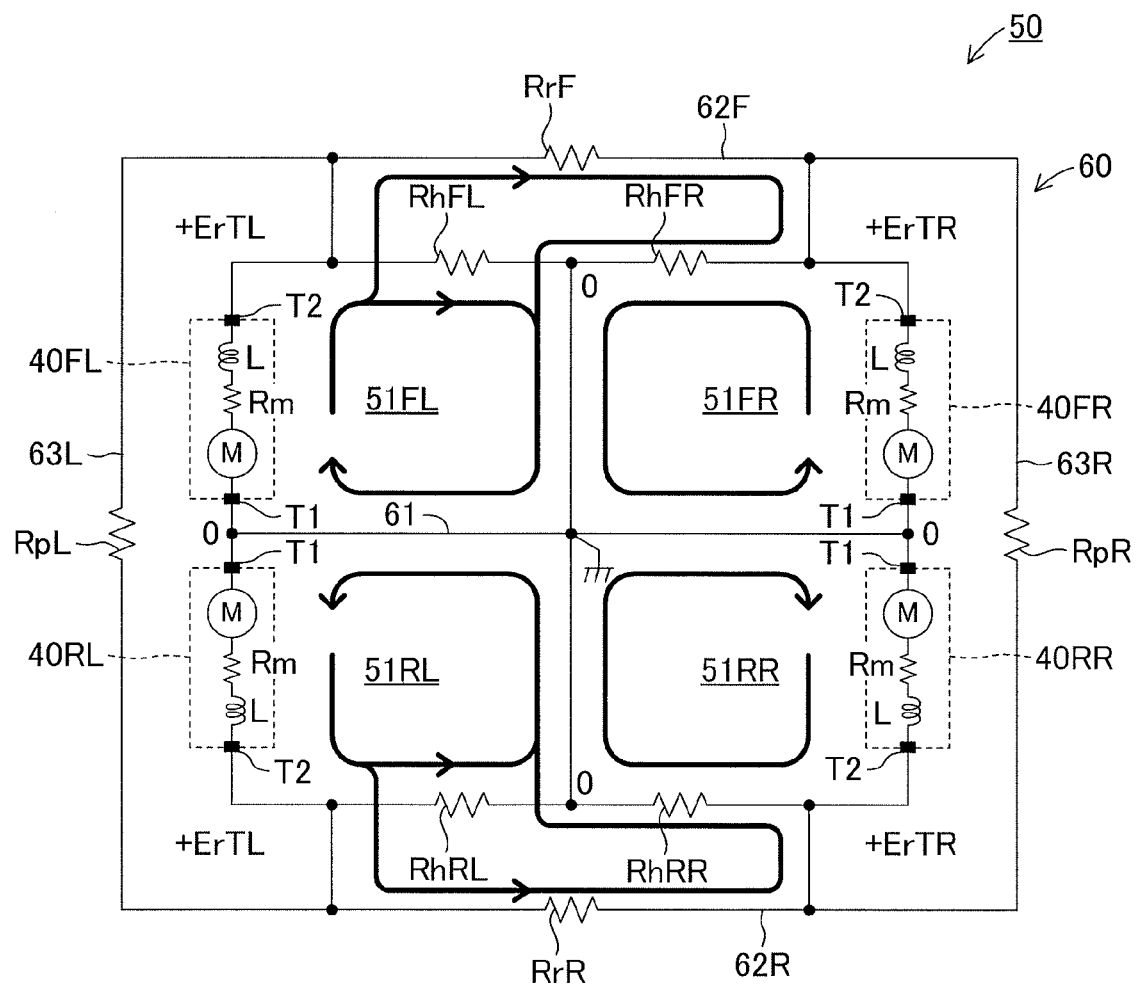
FIG. 15 is an explanatory diagram illustrating the flow of a generated current during bouncing (compression operation) and rolling in combination.

Accordingly, a potential difference (ErTL−ErTR) is generated across each of the resistors RrF and RrR for roll damping force setting, and hence, as illustrated in FIG. 15, a current flows through each of the resistors RrF and RrR for roll damping force setting in the arrow direction. The current value is expressed by (ErTL−ErTR)/Rr. Therefore, a current flowing through each of the left front wheel motor 40FL and the left rear wheel motor 40RL is a value obtained by adding the current ((ErTL−ErTR)/Rr) caused by vehicle rolling to the current (ErTL/Rh) caused by bouncing. On the other hand, a current flowing through each of the right front wheel motor 40FR and the right rear wheel motor 40RR is a value obtained by subtracting the current ((ErTL−ErTR)/Rr) caused by rolling from the current (ErTR/Rh) caused by bouncing.

Therefore, the damping force of the absorbers 30FL and 30RL on the left wheel WFL and WRL side can be increased and the damping force of the absorbers 30FR and 30RR on the right wheel WFR and WRR side can be reduced.

Such vehicle behavior occurs when the vehicle bounces while turning to the right and the four absorbers 30FL, 30FR, 30RL, and 30RR are compressed. In this vehicle behavior, the damping force of the absorbers 30FL and 30RL of the left wheels WFL and WRL on the outer wheel side becomes larger, and hence the leaning of the vehicle body on the left side is suppressed, and the damping force of the absorbers 30FR and 30RR of the right wheels WFR and WRR on the inner wheel side becomes smaller, and hence the leaning of the vehicle body on the right side is allowed. As a result, vehicle rolling can be suppressed to maintain a proper vehicle posture.

As described above, when the stroke speed differs among the absorbers 30FL, 30FR, 30RL, and 30RR, a potential difference is generated between the second current-carrying terminals T2, and a current flows through the motors 40FL, 40FR, 40RL, and 40RR due to the potential difference. In other words, when the vehicle posture is tilted due to rolling or pitching, a current flows in the front wheel roll damping line 62F, the rear wheel roll damping line 62R, the left wheel pitch damping line 63L, and the right wheel pitch damping line 63R in accordance with the potential balance among the second current-carrying terminals T2, and the currents flowing through the motors 40FL, 40FR, 40RL, and 40RR are increased or decreased to be adjusted. Therefore, the four absorbers 30FL, 30FR, 30RL, and 30RR generate an appropriate damping force in accordance with the vehicle posture, to thereby stabilize the vehicle posture.

According to the vehicle suspension device in this embodiment described above, the motors 40FL, 40FR, 40RL, and 40RR are interconnected via the interconnection circuit 60, and hence a satisfactorily damping force can be generated against not only the vehicle bouncing but also the change in posture. Further, the damping coefficient Ch in bouncing can be set properly by adjusting the resistance value of the resistors RhFL, RhFR, RhRL, and RhRR for heave damping force setting, and further, the damping coefficient Cr in rolling can be set properly by adjusting the resistors RrF and RrR for roll damping force setting and the damping coefficient Cp in pitching can be set properly by adjusting the resistors RpL and RpR for pitch damping force setting. Therefore, the damping coefficient Ch can be set to be smaller to obtain soft ride quality while the damping coefficients Cr and Cp can be set to be larger to stabilize the vehicle posture. In this manner, both the comfortable ride quality and stable handling can be achieved.

Such damping force control is performed in a manner that the current spontaneously flows among the motors 40FL, 40FR, 40RL, and 40RR (the roll damping lines 62F and 62R and the pitch damping lines 63L and 63R) in accordance with the vehicle posture. Accordingly, it is not necessary to provide a sensor for detecting various kinds of vehicle behavior, a microcomputer for calculating the control amount of the motor based on a sensor detection value, a motor drive circuit for driving the motor with the calculated motor control amount, and other such components. Therefore, the vehicle suspension device in this embodiment can be embodied at low cost because the motor control system can be configured easily.

In the above, the vehicle suspension device in this embodiment has been described, but the present invention is not limited to the above-mentioned embodiment, and various changes are possible within the range not departing from the object of the present invention.

Figure 16:
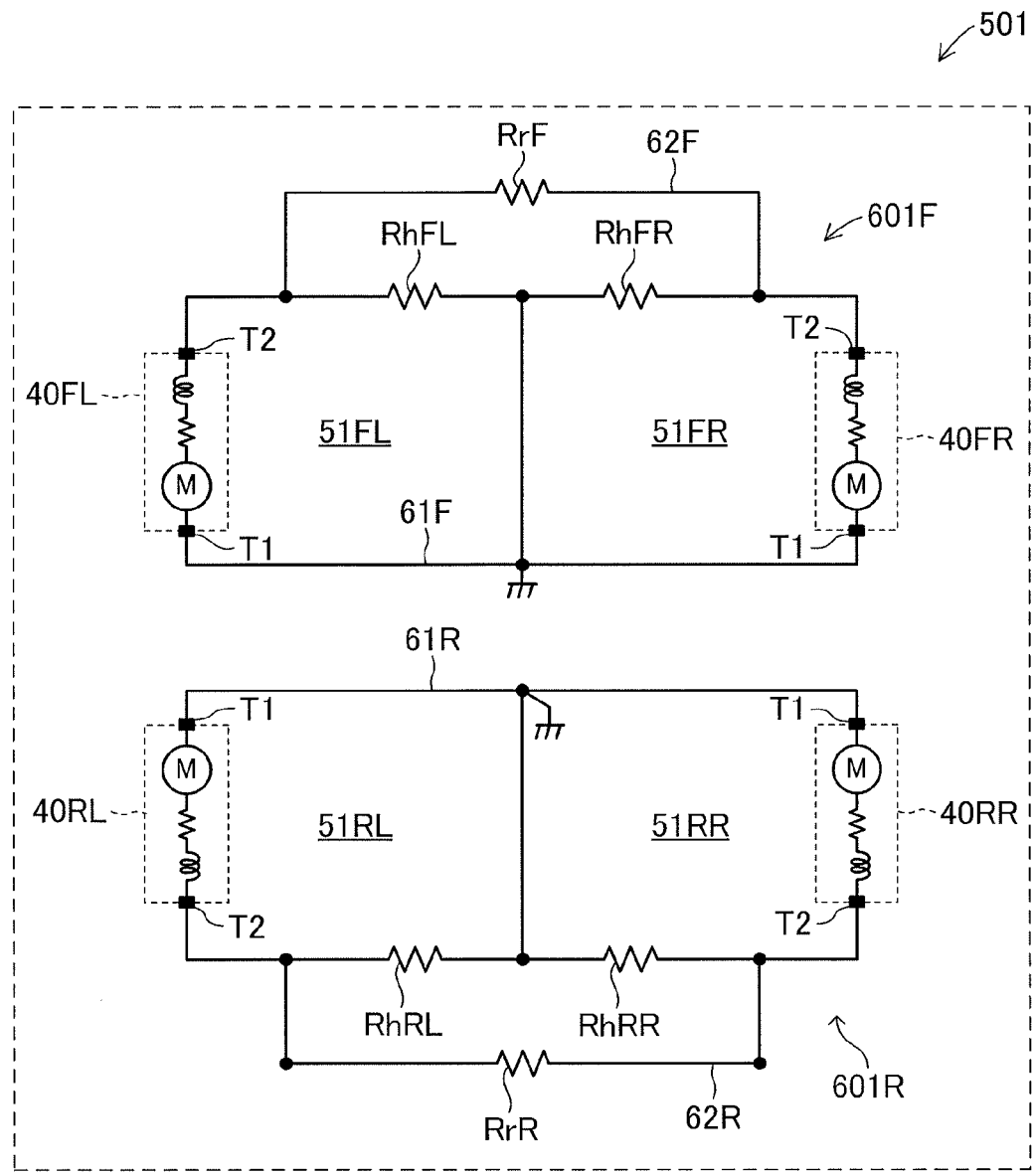
FIG. 16 is a circuit configuration diagram of an external circuit according to a modified example.

For example, this embodiment adopts the configuration in which the motors 40FL, 40FR, 40RL, and 40RR of all the absorbers 30FL, 30FR, 30RL, and 30RR are interconnected via the interconnection circuit 60. Alternatively, however, as illustrated in FIG. 16, the motors 40FL and 40FR of the absorbers 30FL and 30FR on the front wheel WFL and WFR side may not be interconnected to the motors 40RL and 40RR of the absorbers 30RL and 30RR on the rear wheel WRL and WRR side.

In an external circuit 501 in this modified example, the front left wheel motor 40FL and the front right wheel motor 40FR are connected to each other by a front wheel side interconnection circuit 601F, and the rear left wheel motor 40RL and the rear right wheel motor 40RR are connected to each other by a rear wheel side interconnection circuit 601R. The front wheel side interconnection circuit 601F includes a front wheel roll damping line 62F that connects the second current-carrying terminal T2 of the front left wheel motor 40FL and the second current-carrying terminal T2 of the front right wheel motor 40FR to each other via the resistor RrF for roll damping force setting, and a front wheel side ground line 61F that interconnects the first current-carrying terminal T1 of the front left wheel motor 40FL and the first current-carrying terminal T1 of the front right wheel motor 40FR. Further, the rear wheel side interconnection circuit 601R includes a rear wheel roll damping line 62R that connects the second current-carrying terminal T2 of the rear left wheel motor 40RL and the second current-carrying terminal T2 of the rear right wheel motor 40RR to each other via the resistor RrR for roll damping force setting, and a rear wheel side ground line 61R that interconnects the first current-carrying terminal T1 of the rear left wheel motor 40RL and the first current-carrying terminal T1 of the rear right wheel motor 40RR.

In the case of using the external circuit 501, similarly to the above-mentioned embodiment, by adjusting the resistance values Rh of the resistors RhFL, RhFR, RhRL, RhRR for heave damping force setting, the damping coefficient Ch in bouncing of the vehicle can be set to a value that can obtain appropriate ride quality. Also by adjusting the resistance value Rr of the resistors RrF and RrR for roll damping force setting, the damping coefficient Cr in rolling of the vehicle can be set to an appropriate value. In addition, the damping force can be generated independently between the front wheel WFL and WFR side and the rear wheel WRL and WRR side.

In the external circuit 501, the two resistors RrF and RrR for roll damping force setting have the same resistance value, but different values may be set. In this case, the rolling damping coefficient Cr on the front wheel WFL and WFR side and the rolling damping coefficient Cr on the rear wheel WRL and WRR side can set independently. For example, when the resistance value of the resistor RrF is set to be smaller than the resistance value of the resistor RrR, the rolling damping coefficient Cr on the front wheel WFL and WFR side can be set to be larger than the rolling damping coefficient Cr on the rear wheel WRL and WRR side.

Figure 17:
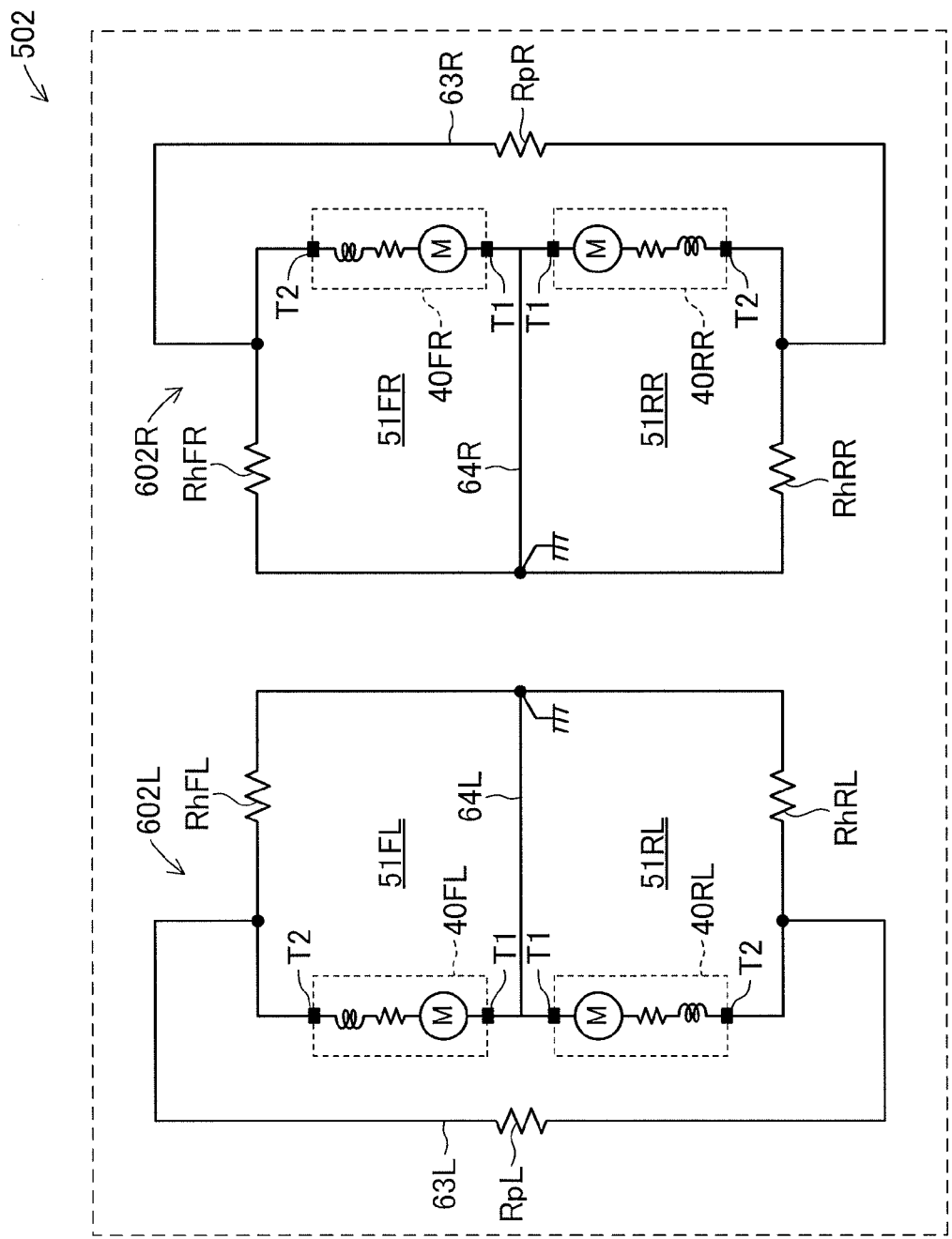
FIG. 17 is a circuit configuration diagram of an external circuit according to another modified example.

Alternatively, as another modified example, as illustrated in FIG. 17, the motors 40FL and 40RL of the absorbers 30FL and 30RL on the left wheel WFL and WRL side may not be interconnected to the motors 40FR and 40RR of the absorbers 30FR and 30RR on the right wheel WFR and WRR side.

In an external circuit 502 in this modified example, the front left wheel motor 40FL and the rear left wheel motor 40RL are connected to each other by a left wheel side interconnection circuit 602L, and the front right wheel motor 40FR and the rear right wheel motor 40RR are connected to each other by a right wheel side interconnection circuit 602R. The left wheel side interconnection circuit 602L includes a left wheel pitch damping line 63L that connects the second current-carrying terminal T2 of the front left wheel motor 40FL and the second current-carrying terminal T2 of the rear left wheel motor 40RL to each other via the resistor RpL for pitch damping force setting, and a left wheel side ground line 64L that interconnects the first current-carrying terminal T1 of the front left wheel motor 40FL and the first current-carrying terminal T1 of the rear left wheel motor 40RL. Further, the right wheel side interconnection circuit 602R includes a right wheel pitch damping line 63R that connects the second current-carrying terminal T2 of the front right wheel motor 40FR and the second current-carrying terminal T2 of the rear right wheel motor 40RR to each other via the resistor RpR for pitch damping force setting, and a right wheel side ground line 64R that interconnects the first current-carrying terminal T1 of the front right wheel motor 40FR and the first current-carrying terminal T1 of the rear right wheel motor 40RR.

In the case of using the external circuit 502, similarly to the above-mentioned embodiment, by adjusting the resistance values Rh of the resistors RhFL, RhFR, RhRL, RhRR for heave damping force setting, the damping coefficient Ch in bouncing of the vehicle can be set to a value that can obtain appropriate ride quality. Also by adjusting the resistance value Rp of the resistors RpL and RpR for pitch damping force setting, the damping coefficient Cp in pitching of the vehicle can be set to an appropriate value. In addition, the damping force can be generated independently between the left wheel WFL and WRL side and the right wheel WFR and WRR side.

Figure 18:
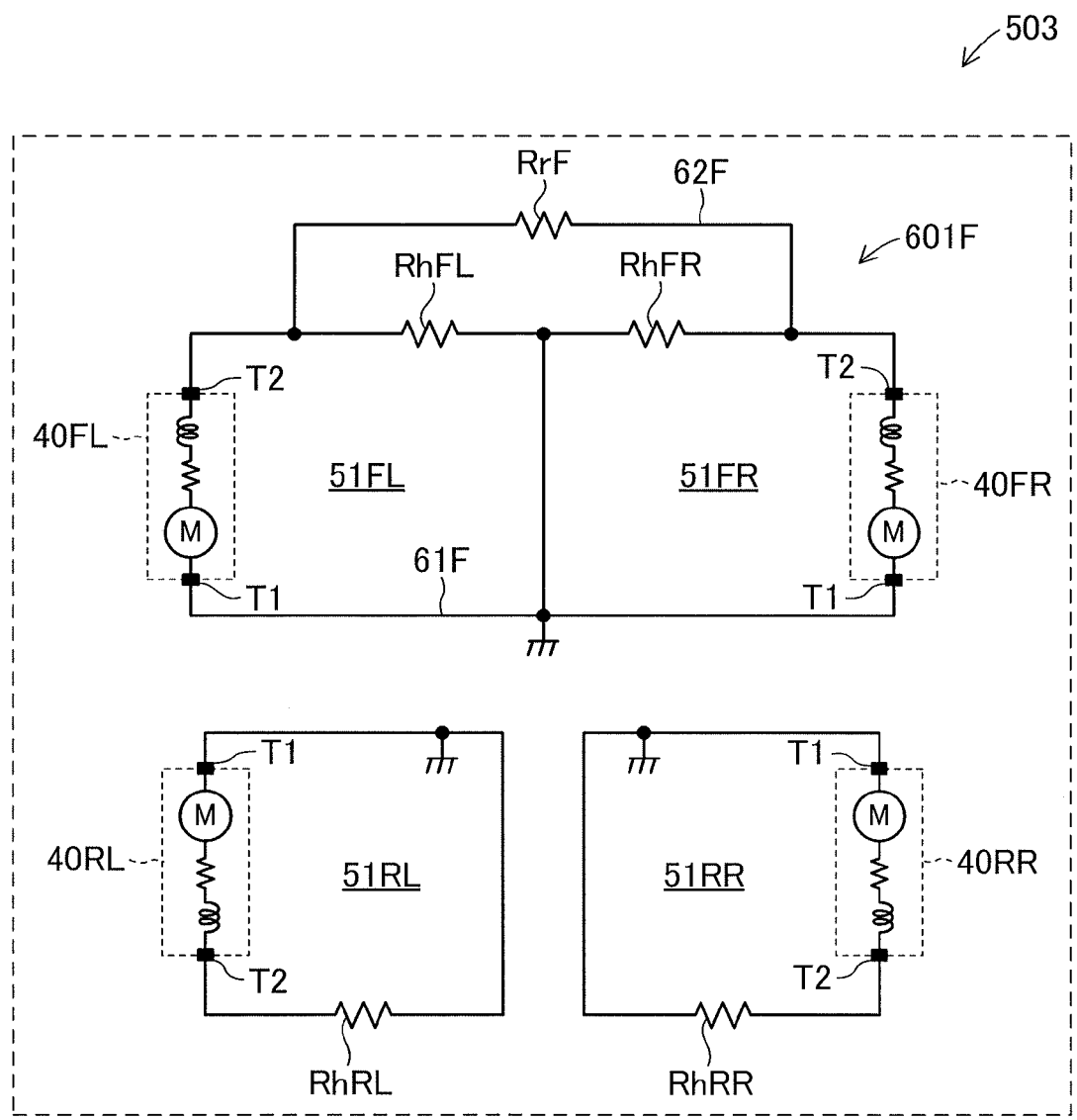
FIG. 18 is a circuit configuration diagram of an external circuit according to still another modified example.

Alternatively, as another modified example, as illustrated in FIG. 18, an external circuit 503 may be provided, in which only the motors 40FL and 40FR of the absorbers 30FL and 30FR on the front wheel WFL and WFR side are interconnected by the front wheel side interconnection circuit 601F. In this case, the closed loop circuit 51RL can be provided in the vicinity of the rear left wheel motor 40RL, and the closed loop circuit 51RR can be provided in the vicinity of the rear right wheel motor 40RR.

Figure 19:
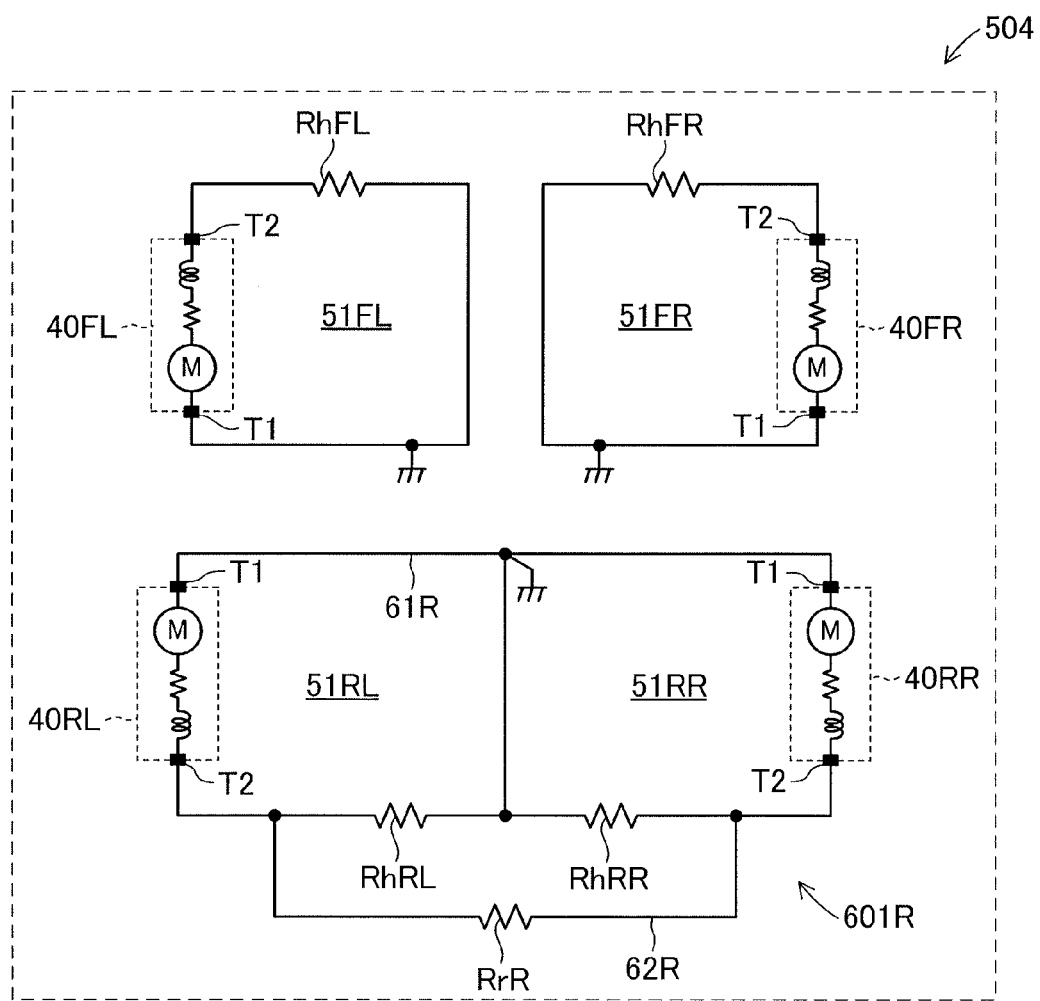
FIG. 19 is a circuit configuration diagram of an external circuit according to yet another modified example.

Alternatively, as another modified example, as illustrated in FIG. 19, an external circuit 504 may be provided, in which only the motors 40RL and 40RR of the absorbers 30RL and 30RR on the rear wheel WRL and WRR side are interconnected by the rear wheel side interconnection circuit 601R. In this case, the closed loop circuit 51FL can be provided in the vicinity of the front left wheel motor 40FL, and the closed loop circuit 51FR can be provided in the vicinity of the front right wheel motor 40FR.

In the vehicle suspension devices according to this embodiment and the modified examples, the electromagnetic shock absorber 30 is provided for all of the four wheels WFL, WFR, WRL, and WRR. Alternatively, however, for example, the electromagnetic shock absorber 30 may be provided only on the front wheel WFL and WFR side, and another type of shock absorber (such as hydraulic damper shock absorber) may be provided on the rear wheel WRL and WRR side. In this case, the front wheel side interconnection circuit 601F is preferably provided on the front wheel WFL and WFR side as illustrated in FIG. 18. Alternatively, the electromagnetic shock absorber 30 may be provided only on the rear wheel WRL and WRR side, and another type of shock absorber (such as hydraulic damper shock absorber) may be provided on the front wheel WFL and WFR side. In this case, the rear wheel side interconnection circuit 601R is preferably provided on the rear wheel WRL and WRR side as illustrated in FIG. 19.

In this embodiment and the modified examples, the resistance values of the four resistors RhFL, RhFR, RhRL, and RhRR for heave damping force setting are all set to the same, but different values may be set. In this case, the bouncing damping coefficient Ch for each of the wheels WFL, WFR, WRL, and WRR can be set independently. Also in this case, it is preferred to set the resistance values of the resistors RhFL and RhFR on the front wheel WFL and WFR side to the same front wheel side resistance value (RhF ohms) and set the resistance values of the resistors RhRL and RhRR on the rear wheel WRL and WRR side to the same rear wheel side resistance value (RhR ohms). For example, the front wheel side resistance value can be set to be smaller than the rear wheel side resistance value (RhF<RhR) so that the bouncing damping coefficient Ch on the front wheel WFL and WFR side may become larger than the bouncing damping coefficient Ch on the rear wheel WRL and WRR side.

In this embodiment and the modified examples, the two resistors RrF and RrR for roll damping force setting have the same resistance value, but different values may be set. In this case, the rolling damping coefficient Cr on the front wheel WFL and WFR side and the rolling damping coefficient Cr on the rear wheel WRL and WRR side can be set independently.

In this embodiment and the modified examples, the two resistors RpL and RpR for pitch damping force setting have the same resistance value, but different values may be set. In this case, the pitching damping coefficient Cp on the left wheel WFL and WRL side and the pitching damping coefficient Cp on the right wheel WFR and WRR side can be set independently.

In this embodiment and the modified examples, the resistors RhFL, RhFR, RhRL, RhRR, RrF, RrR, RpL, and RpR are used as impedance elements for damping force setting, but a coil (inductor) or a capacitor can be used.

In this embodiment and the modified examples, the coil spring 20 is used as a suspension spring, but another spring such as an air spring may be used instead of the coil spring 20.

The invention claimed is:

1. A vehicle suspension device, comprising:
   electromagnetic shock absorbers provided to a plurality of wheels,
      the electromagnetic shock absorbers each comprising:
         a motor for generating a current along with relative motion of a spring upper portion and a spring lower portion; and
         a closed loop circuit that electrically connects a first current-carrying terminal as one of two current-carrying terminals of the motor and a second current-carrying terminal as another of the two current-carrying terminals, for causing the generated current to flow through the motor,
      the electromagnetic shock absorbers each being configured to damp the relative motion of the spring upper portion and the spring lower portion when the generated current flows through the motor along with the relative motion of the spring upper portion and the spring lower portion; and
   an interconnection circuit for electrically connecting the first current-carrying terminals of the motors of the electromagnetic shock absorbers provided to a front left wheel, a front right wheel, a rear left wheel, and a rear right wheel, respectively, to each other, electrically connecting the second current-carrying terminal of the motor of the electromagnetic shock absorber provided to the front left wheel and the second current-carrying terminal of the motor of the electromagnetic shock absorber provided to the front right wheel to each other via an impedance element for front wheel roll damping force setting, electrically connecting the second current-carrying terminal of the motor of the electromagnetic shock absorber provided to the rear left wheel and the second current-carrying terminal of the motor of the electromagnetic shock absorber provided to the rear right wheel to each other via an impedance element for rear wheel roll damping force setting, electrically connecting the second current-carrying terminal of the motor of the electromagnetic shock absorber provided to the front left wheel and the second current-carrying terminal of the motor of the electromagnetic shock absorber provided to the rear left wheel to each other via an impedance element for left wheel pitch damping force setting, and electrically connecting the second current-carrying terminal of the motor of the electromagnetic shock absorber provided to the front right wheel and the second current-carrying terminal of the motor of the electromagnetic shock absorber provided to the rear right wheel to each other via an impedance element for right wheel pitch damping force setting.

* * * * *